(12) United States Patent
Farmer et al.

(10) Patent No.: US 10,907,106 B2
(45) Date of Patent: Feb. 2, 2021

(54) TREATMENT FOR UPGRADING HEAVY CRUDE OIL

(71) Applicant: Locus Oil IP Company, LLC, Solon, OH (US)

(72) Inventors: Sean Farmer, North Miami Beach, FL (US); Ken Alibek, Solon, OH (US); Kent Adams, Oro Valley, AZ (US); Karthik N. Karathur, Solon, OH (US); Anthony Nerris, Solon, OH (US)

(73) Assignee: LOCUS OIL IP COMPANY, LLC, Solon, OH (US)

( * ) Notice: Subject to any disclaimer, the term of this patent is extended or adjusted under 35 U.S.C. 154(b) by 0 days.

(21) Appl. No.: 16/625,288

(22) PCT Filed: Jun. 21, 2018

(86) PCT No.: PCT/US2018/038740
§ 371 (c)(1),
(2) Date: Dec. 20, 2019

(87) PCT Pub. No.: WO2018/237137
PCT Pub. Date: Dec. 27, 2018

(65) Prior Publication Data
US 2020/0216764 A1    Jul. 9, 2020

Related U.S. Application Data

(60) Provisional application No. 62/523,028, filed on Jun. 21, 2017, provisional application No. 62/551,437, filed on Aug. 29, 2017.

(51) Int. Cl.
*C10G 32/00* (2006.01)
*C09K 8/60* (2006.01)

(52) U.S. Cl.
CPC ............ *C10G 32/00* (2013.01); *C09K 8/60* (2013.01); *C10G 2300/206* (2013.01); *C10G 2300/302* (2013.01); *C10G 2300/308* (2013.01)

(58) Field of Classification Search
CPC .............. C10G 32/00; C10G 2300/206; C10G 2300/302; C10G 2300/308; C09K 8/60
See application file for complete search history.

(56) References Cited

U.S. PATENT DOCUMENTS 3,769,164 A * 10/1973 Azarowicz .............. C02F 1/681
                                                      435/281
3,871,956 A    3/1975 Azarowics
(Continued)

FOREIGN PATENT DOCUMENTS

CN    101131087 A  *  2/2008
CN    101988381 A  *  3/2011
(Continued)

OTHER PUBLICATIONS

Applications of Biosurfactants in Petroleum Industry and The Remediationof Oil Spils Silva, Almeida, Ruffino, Luna, Santos, Sarubbo International Journal of Moleuclar Sciences ISSN 1422 0067 2014 15, 152523-15242 (Year: 2014).*
(Continued)

*Primary Examiner* — Pamela H Weiss
(74) *Attorney, Agent, or Firm* — Saliwanchik, Lloyd & Eisenschenk

(57) ABSTRACT

The subject invention provides microbe-based products, as well as their use to improve oil well production and increase the value of heavy crude oil. Specifically, the subject invention provides cultivated yeast products, which can be applied to oil and/or oil and gas production equipment to improve production and increase the economic value of heavy crude oil by, for example, upgrading heavy oils and/or
(Continued)

converting heavy hydrocarbon substances, such as asphalts, asphaltenes, tars, bitumens and/or petcokes into lighter hydrocarbon substances.

11 Claims, 10 Drawing Sheets

(56) References Cited

U.S. PATENT DOCUMENTS

| | | | |
|---|---|---|---|
| 4,450,908 | A | 5/1984 | Hitzman |
| 4,487,262 | A | 12/1984 | Venkatesan et al. |
| 4,522,261 | A | 6/1985 | McInerney et al. |
| 4,793,826 | A * | 12/1988 | Hayes .............. B01F 17/0085 431/2 |
| 4,905,761 | A | 3/1990 | Bryant |
| 6,033,901 | A | 3/2000 | Powell, Jr. |
| 7,681,638 | B2 | 3/2010 | Soni et al. |
| 9,422,470 | B2 | 8/2016 | Xu et al. |
| 9,550,937 | B2 | 1/2017 | Campbell et al. |
| 9,725,986 | B2 | 8/2017 | Xu et al. |
| 10,023,787 | B2 | 7/2018 | Benoit et al. |
| 10,190,038 | B2 | 1/2019 | Armstrong et al. |
| 10,576,519 | B2 * | 3/2020 | Farmer .................. C12R 1/125 |
| 2009/0029879 | A1 | 1/2009 | Soni et al. |
| 2010/0044031 | A1 | 2/2010 | Fallon et al. |
| 2011/0139262 | A1 | 6/2011 | Aburto Anell et al. |
| 2011/0252696 | A1 * | 10/2011 | Franklin .............. C10L 1/026 44/388 |
| 2012/0122740 | A1 | 5/2012 | Roldan Carrillo et al. |
| 2012/0247763 | A1 * | 10/2012 | Rakitsky .............. C09K 8/487 166/279 |
| 2012/0292022 | A1 | 11/2012 | Choban et al. |
| 2013/0062053 | A1 | 3/2013 | Kohr et al. |
| 2013/0281328 | A1 * | 10/2013 | Podella .............. C09K 8/582 507/241 |
| 2013/0324406 | A1 | 12/2013 | Chisholm et al. |
| 2014/0273150 | A1 | 9/2014 | Angel |
| 2014/0305649 | A1 | 10/2014 | Tang et al. |
| 2014/0360727 | A1 | 12/2014 | Milam et al. |
| 2015/0037302 | A1 | 2/2015 | Bralkowski et al. |
| 2015/0045290 | A1 | 2/2015 | Coutte et al. |
| 2015/0053545 | A1 * | 2/2015 | Gordon .............. C10G 11/14 204/157.62 |
| 2015/0068950 | A1 | 3/2015 | See et al. |
| 2015/0259642 | A1 | 9/2015 | Sangwai et al. |
| 2015/0300139 | A1 | 10/2015 | Armstrong et al. |
| 2016/0002521 | A1 * | 1/2016 | Dillon .............. C10M 159/02 507/101 |
| 2016/0032161 | A1 * | 2/2016 | Campbell .............. C10L 1/04 585/4 |
| 2016/0145487 | A1 | 5/2016 | Alam et al. |
| 2016/0222280 | A1 | 8/2016 | Kohr et al. |
| 2016/0244347 | A1 | 8/2016 | Angel |

FOREIGN PATENT DOCUMENTS

| | | | | |
|---|---|---|---|---|
| CN | 102352227 | A | | 2/2012 |
| CN | 102766579 | A | | 11/2012 |
| CN | 103160452 | A | * | 6/2013 |
| CN | 104109646 | A | | 10/2014 |
| CN | 104405340 | A | * | 3/2015 |
| CN | 103147731 | B | * | 8/2015 |
| CN | 102587875 | B | * | 12/2015 |
| CN | 105567580 | A | | 5/2016 |
| CN | 105753283 | A | | 7/2016 |
| CN | 105273700 | B | * | 7/2018 |
| KR | 101481459 | B1 | * | 1/2015 ......... B65D 83/0061 |
| WO | 2007129332 | A1 | | 11/2007 |
| WO | 2010111226 | A2 | | 9/2010 |
| WO | 2011008570 | A2 | | 1/2011 |
| WO | 2014152350 | A1 | | 9/2014 |
| WO | WO-2015109221 | A1 | * | 7/2015 ......... C12N 9/0069 |
| WO | 2015167864 | A1 | | 11/2015 |
| WO | 2017044953 | A1 | | 3/2017 |
| WO | 2018049182 | A2 | | 3/2018 |
| WO | 2018107162 | A1 | | 6/2018 |

OTHER PUBLICATIONS

Application of Bacterial and Yeast Biosurfactants for Enhanced Removal and Biodegreadation of Motor Oil From Contaminated Sand Chaprao, Ferreira, Correa, Rufino, Luna, Silva, Sarubbo Electronic Journal of Biotechnology 18 (2015) 471-479 (Year: 2015).*

Chromium Adsoprtion by Three Yeast Strains Iolsated from Sediments in Morocco by Wifak Bahafid, Nezha Tahri Joutey, Hanane Sayel, Mohamed Iraqui-Houssaini and Naima El Ghachtouli, Geomicrobiology Journal (2013) 30, 422-429 (Year: 2013).*

Biodegradation Involved Micororganisms and Genetically Engineered Microoroganixms published Jun. 2013 by Nezha Tahri Joutey, Wifak Bahafid, Hanane Sayel and Naima El Ghachtouli (Year: 2013).*

Applications of Biosurfactants in Petroleum Industry and the Remediation of Oil Spills, Rita de Cassia, F S Silva, Dame G Almeida, Raquel D Ruffino, Juliana M Luna, Valdemir A Santos and Leonie Asfora Sarubbo Int J Mol Sci 2014 15, 12523-12542 (Year: 2014).*

Application of Bacterial and Yeast Biosurfactants for Enhanced Removal and Biodegradation of motor oil from Contaminated Sand Marcos J Chaprao, Isablea NS Ferreira, Priscialla Correa, Raqueal D Ruffino Juliana M Luna Elias J Silva and Ieonie A Sarubbo Eletronic Journa of Biotechnology 18 (2015) 471-4 (Year: 2015).*

Amani, H., et al., "Comparative study of biosurfactant producing bacteria in MEOR applications." Journal of Petroleum Science and Engineering. 2010, 75: 209-214.

Castaneda, L.C., et al., "Current situation of emerging technologies for upgrading of heavy oils." Catalysis Today, 2014, 220-222: 248-273.

De Almeida, D., et al., "Biosurfactants: Promising Molecules for Petroleum Biotechnology Advances." Frontiers in Microbiology, Oct. 2016, 7(1718): 1-14.

De Brito, D., Biosurfactants from renewable raw materials, Universidade do Minho Departamento de Engenharia Biologica, Nov. 2013, pp. 1-93.

De Oliveira, M., et al., "Review: Sophorolipids A Promising Biosurfactant and it's Applications." International Journal of Advanced Biotechnology and Research, 2015, 6(2): 161-174.

Elshafie, A. E., et al., "Sophorolipids Production by Candida bombicola ATCC 22214 and its Potential Application in Microbial Enhanced Oil Recovery." Frontiers in Microbiology, Nov. 2015, 6(1324): 1-11.

El-Sheshtawy, H.S., et al., "Production of biosurfactants by Bacillus licheniformis and Candida albicans for application in microbial enhanced oil recovery." Egyptian Journal of Petroleum, 2016, 25: 293-298.

Ghojavand, H. et al., "Isolation of thermotolerant, halotolerant, facultative biosurfactant-producing bacteria." Appl. Microbiol. Biotechnol, Oct. 2008, 80(6): Abstract, doi: 10,1007/s00253-008-1570-7.

Gudina, E., et al., "Biosurfactant-producing and oil-degrading Bacillus subtilis strains enhance oil recovery in laboratory sand-pack columns." Journal of Hazardous Materials, 2013, 261: 106-113.

Kurtzman, C.P., et al., "Production of sophorolipid biosurfactants by multiple species of the *Starmerella (Candida)* bombicolayeast clade." FEMS Microbiol Lett, 2010, 311: 140-146.

Nitschke, M., et al., "Production and properties of a surfactant obtained from Bacillus subtilis grown on cassava wastewater." Bioresource Technology, 2006, 97: 336-341.

Nur, H.A., et al., "*Saccharomyces cerevisiae* from Baker's Yeast for Lower Oil Viscosity and Beneficial Metabolite to Improve Oil Recovery: An Overview." Applied Mechanics and Materials, 2014, 625: 522-525.

Pacwa-Plociniczak, M. et al., "Review: Environmental Applications of Biosurfactants: Recent Advances." Int. J. Mol. Sci., 2011, 12: 633-654.

(56) References Cited

OTHER PUBLICATIONS

Rocha E Silva, F.C.P., et al., "Yeasts and bacterial biosurfactants as demulsifiers for petroleum derivative in seawater emulsions." AMB Expr., 2007, 7(202): 1-13.

Santos, D.K.F., et al., "Biosurfactants: Multifunctional Biomolecules of the 21st Century." International Journal of Molecular Sciences, 2016, 17(401): 1-31.

Sen, R., "Biosurfactants: Advances in Experimental Medicine and Biology." Landes Bioscience and Springer Science+Business Media, LLC, 2010, 672: 1-331.

Sharma, A. et al., "A study on biosurfactant production in *Lactobacillus* and *Bacillus* sp." Int. J. Curr. Microbiol. App. Sci., 2014, 3(11): 723-733.

Silva, R., et al., "Applications of Biosurfactants in the Petroleum Industry and the Remediation of Oil Spills." International Journal of Molecular Sciences, 2014, 15: 12523-12542.

Thaniyavarn, J., et al., "Production of Sophorolipid Biosurfactant by Pichia anomala." Bioscience, Biotechnology, and Biochemistry, 2008, 72(8): 2061-2068.

\* cited by examiner

TREATMENT FOR UPGRADING HEAVY CRUDE OIL

CROSS-REFERENCE TO RELATED APPLICATIONS

This application is a National Stage Application of International Application No. PCT/US2018/038740, filed. Jun. 21, 2018; which claims priority to U.S. Provisional Application No. 62/523,028, filed Jun. 21, 2017, and U.S. Provisional Application No. 62/551,437, filed Aug. 29, 2017, all of which are incorporated herein by reference in their entirety.

BACKGROUND OF THE INVENTION

The oil and gas industry relies upon a network of processes and equipment to recover hydrocarbons from the earth and ultimately prepare them for consumer use. Certain forms of hydrocarbons require conversion, or "upgrading," after recovery to help with transportation or to enhance their value at sale. The importance of upgrading these forms is ever-increasing, given the decline in available conventional hydrocarbon resources, and the increasing costs to extract, upgrade and refine heavy hydrocarbon resources.

Forty percent of the world's total oil reserves are heavy and extra heavy oil, accounting for 3.6-5.2 trillion bbl of oil. Thus, recovery of these highly viscous hydrocarbons could have major economic significance. Nonetheless, because most heavy and extra heavy oils, asphalts, tars and/or bitumens are highly viscous, they are burdensome to extract and transport. For example, a significant amount of energy is required to pump oil with higher viscosity through pipelines to refineries and processing facilities. Additionally, viscosity affects the speed at which crude oil can be pumped, with more viscous oils contributing to a decrease in overall productivity for an oil field.

Heavy hydrocarbons often must be maintained at elevated temperatures to remain flowable, and/or mixed with a lighter hydrocarbon diluent to enable pipeline transportation. Diluents can be expensive and can be costly to transport to oil production sites. Further, heavier crudes, which can contain bitumens, asphaltenes, resins, paraffins and/or other heavy hydrocarbons, can hinder processing due to the additional presence of salts, metals, and organic acids.

Using heavy oils can also be challenging when there is a substantial asphaltene content (e.g. 2-12 weight %). Asphaltene is difficult to burn, so a significant amount passes through the furnace as unburned particulate matter, decreasing the thermal efficiency of the fuel and creating serious environmental problems. The unburned combustibles frequently comprise low density, electrically-conductive cenospheric materials having a high carbon content, which makes collection of these materials difficult for electrostatic precipitators. Consequently, an increase in particular emissions often results. Furthermore, unburned carbon tends to absorb sulfuric acid, a by-product of combustion of high sulfur oils, in the combustion system and stack. This results in acid smut fallout.

Refiners continue to seek improved methods for processing and converting, or upgrading, heavy crude oil resources into more useful end products while minimizing deleterious environmental impacts. Nonetheless, many refineries are still poorly-suited for processing heavy crude oils, asphaltenes, or bitumen. In a refinery, crude oil is distilled in a column to separate the heavier hydrocarbon fractions from the lighter hydrocarbon fractions, which are used to make, for example, transportation fuels and lubricating oils and waxes. The lighter hydrocarbon products are collected, leaving behind asphalt and other heavy residual crude products, or "residuum," or "resid."

The resid usually undergoes additional processing, called "coking." A coker thermally breaks down, or cracks, large hydrocarbon molecules into shorter chain molecules to produce a byproduct known as petroleum coke, "petro coke," or "petcoke." Petcoke is the co-product of upgrading resid into gasoline and middle distillate-range fuels. Petcoke is a black-colored solid composed primarily of carbon, and may contain limited amounts of elemental forms of sulfur, metals, and non-volatile inorganic compounds.

The petroleum industry and federal regulators characterize petcoke as a "co-product" because it may have some commercial value as a boiler fuel and as a raw material in manufacturing. Nearly half of U.S. petroleum refineries employ "coking" processes. Refineries also produce petcoke as a by-product of catalysis, which the refineries later consume as a fuel. Despite the range of potential uses for petcoke, high levels of carbon dioxide are emitted from petcoke combustion. Additionally, because petcoke cannot be easily converted to useful products by conventional methods, it is commonly removed from the process, thus reducing the overall potential yield of valuable hydrocarbon material from the upgrading process.

Upgrading petroleum compositions is primarily focused on increasing API gravity and reducing sulfur, metals, and asphaltene content in heavy hydrocarbons. Because refineries often lack the equipment or processes required for upgrading, the viscosity, density and impurity content (i.e., heavy metal, sulfur and nitrogen, content) of such heavy materials must often be altered before refining can occur. A number of layouts for upgrading heavy feeds are possible for refineries, but there are many factors such as oil and product prices, market trends, local needs, physical and chemical properties of the available heavy oil and residua, refinery configuration, and others that must be taken into consideration to define a specific upgrading process scheme. Thus, no general methods exist that can provide a scalable, cost-effective, and environmentally friendly solution to the need for upgrading heavy hydrocarbons.

Because of the importance of safe and efficient oil and gas production, the production and transport challenges caused by heavy molecular weight organic compounds in crude oil, and the untapped potential of heavy oils to be converted into useful products, there is a continuing need for improved methods of upgrading heavy oils, asphaltenes, bitumens and petcoke.

BRIEF SUMMARY OF THE INVENTION

The subject invention provides microbe-based products, as well as their use to improve oil well production and increase the value of crude oil. Specifically, the subject invention provides cultivated yeast products, which can be applied to crude oil and/or to oil and gas production equipment to improve production and increase the value of crude oil by, for example, upgrading heavy oils. Advantageously, the microbe-based products and methods of the subject invention are environmentally-friendly, operational-friendly and cost-effective.

In certain embodiments, the subject invention provides microbe-based products, as well as methods of their use, for improving one or more qualities of oil. Preferably, the oil is heavy oil, which includes extra heavy oil. For example, the subject invention is useful for upgrading heavy oil containing, for example, asphaltenes, and for converting, e.g., asphalt, asphaltenes, bitumens, tars and/or petcoke into lighter, more useful hydrocarbons substances.

In certain embodiments, the subject invention provides methods for improving one or more qualities of oil, for stimulating oil wells, and/or for improving oil production efficiency, by applying a yeast-based composition having a yeast microbe and/or one or more growth by-products thereof to crude oil or to an oil well. Furthermore, the method can optionally comprise applying an ionic or semi-ionic liquid with the microbe-based composition. In preferred embodiments, the crude oil is heavy oil.

Application of the yeast-based compositions can be performed during oil recovery processes, during storage and transport, and/or before the refining process. The yeast-based compositions can be applied to a wellbore, an oilfield storage tank, a tanker, a pipeline and/or oil refinery equipment, and/or can be used for treating oil recovered from tar sands or a remediation site.

The yeast-based composition can also be applied to heavy hydrocarbon substances, such as asphalt, asphaltenes, bitumens, tars and/or petcoke, to convert such substances into lighter, more useful hydrocarbon substances.

The yeast-based composition can comprise yeast microbes and their growth by-products, or, the composition can comprise only yeast growth by-products with the microbes separated (i.e., removed) therefrom. The growth by-products can be any microbial metabolite, such as, for example, a biosurfactant.

In one embodiment, the method for improving one or more qualities of oil is used for upgrading heavy oil and/or converting heavy hydrocarbons into lighter hydrocarbon substances.

In one embodiment, the method for improving one or more qualities of oil is used for increasing the API gravity of heavy oil (including extra heavy oil). In one embodiment, the API gravity can be increased to values above about 200, even more preferably above about 25°, 30° or even 31°.

The oil can be treated in situ, for example, while it is still in a subterranean formation. The subject invention can be used in any type of oil well, including, for example, horizontal, vertical and/or fracking wells.

The oil can also be treated after it has been recovered from an oil well, while it is being stored or transported. Advantageously, this allows for more efficient oil recovery and/or transport due to improved oil qualities, such as reduced viscosity.

In one embodiment, the methods can further comprise the step of subjecting recovered oil to cavitation either immediately prior to, simultaneously with, and/or sometime after the subject microbe-based composition has been applied thereto. This is particularly useful with heavy and extra heavy oil, as the method can be useful for reducing the viscosity of the oil. The cavitation can be effected using machinery known in the art, for example, hydrodynamic or ultrasonic cavitation methods.

Advantageously, the subject invention can be used to increase the BTU of, e.g., crude oil, heavy crude, asphalts, asphaltenes, bitumens, tar and petcoke with no loss of hydrocarbon content or value. Thus, the subject invention provides methods for increasing the BTU of crude oil and other heavy hydrocarbons.

Furthermore, the subject invention can be used to reduce the viscosity of heavy oil to values below 200 cp, below 150 cp, or even values below 100 cp, 50 cp, or lower, and/or increase the API gravity by 1%, 10%, 50%, 100%, 200% or greater. In one embodiment, API gravity can be increased from values lower than 120 (extra heavy oils) to values higher than 12°, increased from values lower than 20° to values higher than 20° (heavy oils), and even to values of 250 or 30° or higher (medium to light oils).

In preferred embodiments, the subject methods utilize a microbe-based composition comprising a cultivated yeast strain and/or by-products of its growth. In a specific embodiment, the microbes are capable of producing beneficial metabolites, such as, for example, biosurfactants. In one embodiment, the invention provides a microbe-based product comprising cultivated *Starmerella* clade yeasts and/or growth by-products thereof, cultivated *Wickerhamomyces* or *Pichia* clade yeasts, and/or growth by-products thereof, or any yeast species related to these clades (e.g., belonging to the same family or genus), and/or growth by-products thereof.

The microbe-based compositions according to the subject invention are obtained through cultivation processes ranging from small to large scale. The cultivation process can be, for example, submerged cultivation, solid state fermentation (SSF), and/or a combination thereof.

In certain embodiments, the microbe-based composition comprises one or more biosurfactants. The biosurfactants can be selected from glycolipids, such as sophorolipids (SLP), rhamnolipids (RLP), trehalose lipids (TL), and mannosylerythritol lipids (MEL). The biosurfactants can also be selected from lipopeptides, such as surfactin, iturin, fengycin and lichenysin.

The biosurfactants can be present in the composition as a result of microbial growth, i.e., they can be produced by the microorganisms of the microbe-based composition. Alternatively, or additionally, the biosurfactants can be added in a purified form and/or in a crude form (e.g., in the form of fermentation broth without being subjected to purification). In some embodiments, the composition further comprises an ionic or semi-ionic liquid.

In certain embodiments, use of yeast-based compositions according to the subject invention can be superior to, for example, purified microbial metabolites alone, due to, for example, the advantageous properties of the yeast cell walls. These properties include high concentrations of mannoprotein as a part of yeast cell wall's outer surface (mannoprotein is a highly effective bioemulsifier) and the presence of the biopolymer beta-glucan (also an effective emulsifier) in yeast cell walls. Additionally, the yeast fermentation product further can comprise a variety of metabolites in the culture, including biosurfactants, which are capable of reducing both surface and interfacial tension, emulsifying oil, and improving oil mobility, as well as others (e.g., lactic acid, ethyl acetate, ethanol, etc.).

In certain embodiments of the subject method, when oil is being treated in situ, the yeasts of the yeast-based composition have preferably been separated from the composition. For example, a composition comprising one or more biosurfactants and one or more other microbial growth by-products can be injected into a well or an oil-bearing formation to upgrade the heavy oil therein.

In other embodiments, with post-recovery treatment of oil, the yeast-based composition can comprise yeasts (either live or inactive) and growth by-products thereof.

In some embodiments, the compositions and methods of the subject invention can be used to supplement and/or enhance other mechanical, thermal, or chemical methods for upgrading heavy hydrocarbons. Conversely, other mechanical, thermal or chemical methods can also be used to supplement and/or enhance the compositions and methods of the subject invention.

The microbe-based products of the subject invention can be used in a variety of unique settings because of, for example, the ability to efficiently deliver fresh fermentation broth with active metabolites; a mixture of cells and fermentation broth; a composition with live cells and/or inactive cells; compositions with a high density of cells; microbe-based products on short-order; and microbe-based products in remote locations.

DETAILED DESCRIPTION

The subject invention provides microbe-based products, as well as their use to improve oil well production and increase the value of crude oil. Specifically, the subject invention provides cultivated yeast products, which can be applied to crude oil and/or to oil and gas production equipment to improve production and increase the value of crude oil by, for example, upgrading heavy oils. Advantageously, the microbe-based products and methods of the subject invention are environmentally-friendly, operational-friendly and cost-effective.

In certain embodiments, the subject invention provides microbe-based products, as well as methods of their use, for improving one or more qualities of oil, stimulating oil wells, and/or improving oil production efficiency, by applying a composition having a yeast microbe and/or a growth product thereof to crude oil or to an oil well. Preferably, the oil is heavy oil.

In some embodiments, the subject invention is useful for upgrading heavy oil or for converting heavy hydrocarbon substances, e.g., asphalt, asphaltenes, bitumens, tars and/or petcoke, into lighter hydrocarbon substances with greater utility than their heavier predecessors.

If desired, the subject compositions and methods can be used to supplement and/or enhance, or can be supplemented and/or enhanced by, existing mechanical, thermal and/or chemical treatments.

Figure 10A:
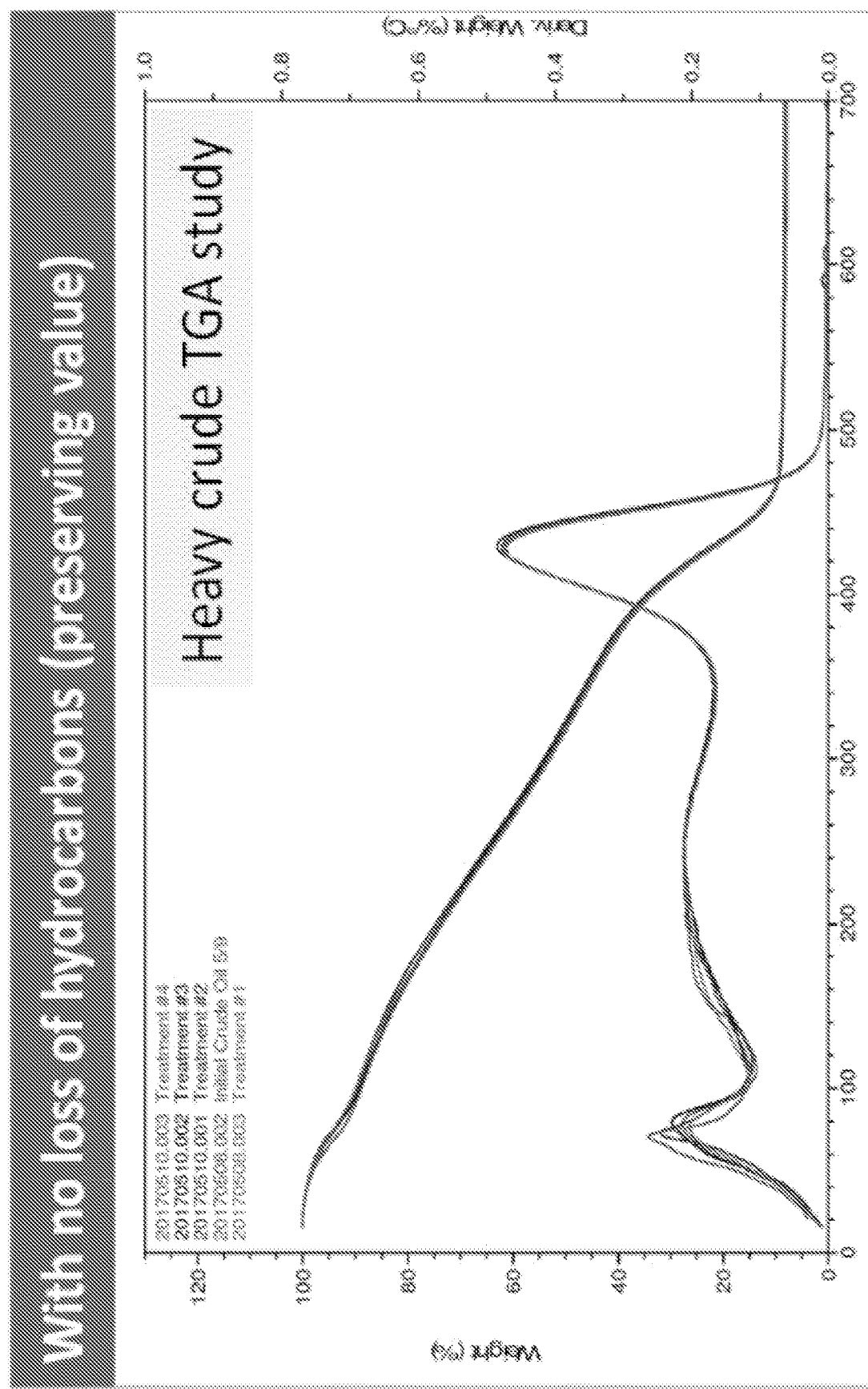
FIGS. 10A-10B show results of a heavy crude TGA study (10A) and BTU increase (10B) after treatment with the subject invention.
Figure 10B:
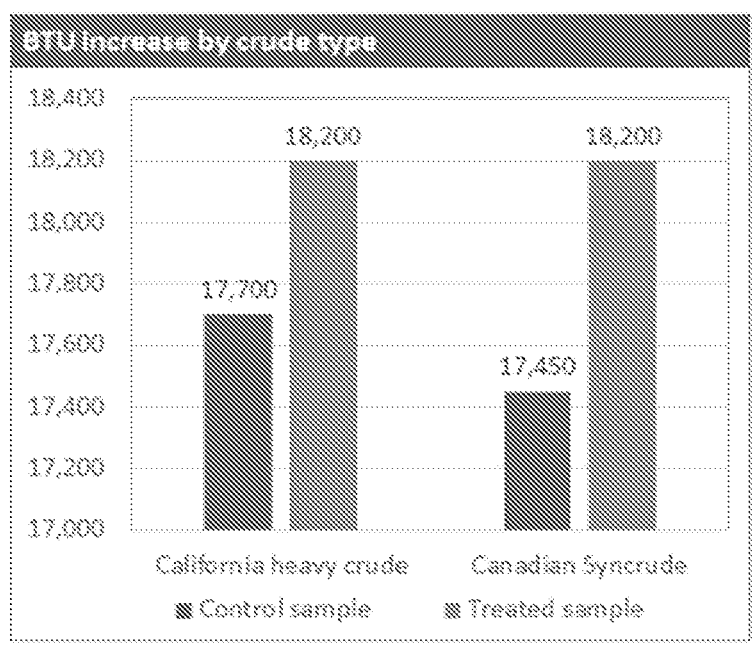

Advantageously, as shown in FIG. 10, the subject invention can be used to increase the BTU of crude oil, heavy crude and petcoke with no loss of hydrocarbon content or value and no increase in total acid number (TAN). Accordingly, the subject invention provides methods for increasing the BTU of crude oil, which can also be used to increase the value of heavy crude reserves.

Furthermore, the subject invention can be used to reduce the viscosity of heavy oil to values below 200 cp, below 150 cp, or even values below 100 cp, 50 cp, or lower, and/or increase the API gravity by 1%, 10%, 50%, 100%, 200% or greater. In one embodiment, API gravity can be increased from values lower than 12° (extra heavy oils) to values higher than 12°, increased from values lower than 20° to values higher than 20° (heavy oils), and even to values of 25° or 30° or higher (medium to light oils).

Selected Definitions

As used herein, reference to a "microbe-based composition" means a composition that comprises components that were produced as the result of the growth of microorganisms or other cell cultures. For example, a yeast-based composition is a microbe-based composition comprising components that were produced as the result of cultivation of yeasts. The microbe-based composition may comprise the microbes themselves and/or by-products of microbial growth. The microbes may be active, vegetative or inactive, or a mixture of these. The microbes may be planktonic or in a biofilm form, or a mixture of both. The by-products of growth may be, for example, metabolites (e.g., biosurfactants), cell membrane components, expressed proteins, and/or other cellular components. The microbes may be intact or lysed. The cells may be absent (i.e., separate or removed) from the composition, or present at, for example, a concentration of $1 \times 10^4$, $1 \times 10^5$, $1 \times 10^6$, $1 \times 10^7$, $1 \times 10^8$, $1 \times 10^9$, $1 \times 10^{10}$, or $1 \times 10^{11}$ or more cells per milliliter of the composition.

The subject invention further provides "microbe-based products," which are products that are to be applied in practice to achieve a desired result. The microbe-based product can be simply the microbe-based composition harvested from the microbe cultivation process. Alternatively, the microbe-based product may have components that are removed (e.g., cells) or may comprise further ingredients that have been added. These additional ingredients can include, for example, stabilizers, buffers, carriers (e.g., water or salt solutions), added nutrients to support further microbial growth, non-nutrient growth enhancers and/or agents that facilitate tracking of the microbes and/or the composition in the environment to which it is applied. The microbe-based product may also comprise mixtures of microbe-based compositions. The microbe-based product may also comprise one or more components of a microbe-based composition that have been processed in some way such as, but not limited to, filtering, centrifugation, lysing, drying, purification and the like.

A "metabolite" refers to any substance produced by metabolism or a substance necessary for taking part in a particular metabolic process. A metabolite can be an organic compound that is a starting material (e.g., glucose), an intermediate (e.g., acetyl-CoA) in, or an end product (e.g., n-butanol) of metabolism. Examples of metabolites can include, but are not limited to, enzymes, toxins, acids, solvents, alcohols, proteins, carbohydrates, vitamins, minerals, microelements, amino acids, polymers, and surfactants.

As used herein, "isolated" or "purified" compounds, e.g., nucleic acid molecules, polynucleotides, polypeptides, proteins or organic compounds, are substantially free of other compounds, such as cellular material, with which they are associated in nature. A purified or isolated polynucleotide (RNA or DNA) is free of the genes or sequences that flank it in its naturally-occurring state. A purified or isolated polypeptide is free of other molecules, or the amino acids that flank it, in its naturally-occurring state. A purified or isolated microbial strain is removed from the environment in which it exists in nature. Thus, the isolated strain may exist as, for example, a biologically pure culture, or as spores (or other forms of the strain) in association with, for example, a carrier.

In certain embodiments, purified compounds are at least 60% by weight the compound of interest. Preferably, the preparation is at least 75%, more preferably at least 90%, and most preferably at least 99%, by weight the compound of interest. For example, a purified compound is one that is at least 90%, 91%, 92%, 93%, 94%, 95%, 98%, 99%, or 100% (w/w) of the desired compound by weight. Purity is measured by any appropriate standard method, for example, by column chromatography, thin layer chromatography, or high-performance liquid chromatography (HPLC) analysis.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50 as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

As used herein, "reduces" means a negative alteration of at least 1%, 5%, 10%, 25%, 50%, 75%, or 100%.

As used herein, "reference" means a standard or control condition.

As used herein, "surfactant" means a surface-active substance that lowers the surface tension (or interfacial tension) between two liquids or between a liquid and a solid. Surfactants act as, e.g., detergents, wetting agents, emulsifiers, foaming agents, and/or dispersants.

A "biosurfactant" is a surface-active substance produced by a living cell. Biosurfactants are biodegradable and can be produced efficiently using selected organisms on renewable substrates. All biosurfactants are amphiphiles. They consist of two parts: a polar (hydrophilic) moiety and non-polar (hydrophobic) group. Due to their amphiphilic structure, biosurfactants increase the surface area of hydrophobic water-insoluble substances, increase the water bioavailability of such substances, and can even change the properties of bacterial cell surfaces.

Biosurfactants include low molecular weight glycolipids (e.g., rhamnolipids, sophorolipids, trehalose lipids and mannosylerythritol lipids), lipopeptides (e.g., surfactin, iturin, fengycin and lichenysin), flavolipids, phospholipids, and high molecular weight polymers such as lipoproteins, lipopolysaccharide-protein complexes, and polysaccharide-protein-fatty acid complexes. The common lipophilic moiety of a biosurfactant molecule is the hydrocarbon chain of a fatty acid, whereas the hydrophilic part is formed by ester or alcohol groups of neutral lipids, by the carboxylate group of fatty acids or amino acids (or peptides), organic acid in the case of flavolipids, or, in the case of glycolipids, by the carbohydrate.

As used herein, "heavy oil" or "heavy hydrocarbons" mean viscous hydrocarbon substances. Heavy hydrocarbons may comprise highly viscous hydrocarbons such as heavy oil, extra heavy oil, bitumen, tar, petcoke, asphaltenes and/or asphalt. Heavy oils and extra heavy oils are highly viscous with a density close to or even exceeding water. The phrase "heavy oil" as used herein also includes "extra heavy oil." Heavy hydrocarbons may comprise moderate to high quantities of paraffins, resins and asphaltenes, as well as smaller concentrations of sulfur, oxygen, and nitrogen. Heavy hydrocarbons may also include aromatics or other complex ring hydrocarbons. Additional elements, e.g., metals, may also be present in heavy hydrocarbons in trace amounts. Heavy hydrocarbons may be classified by API gravity. Heavy hydrocarbons generally have an API gravity below about 200 or lower. Heavy oil, for example, generally has an API gravity of about 10-20°, whereas extra heavy oil generally has an API gravity below about 120. The viscosity of heavy hydrocarbons is generally greater than about 200 cp at reservoir conditions, and that of extra heavy oil is generally about 10,000 cp or more. (For reference, as used herein, "light oil" or "light hydrocarbons" have an API gravity above 20°, preferably above about 25°, even more preferably above 30° to 31°, and a viscosity of about 1 to 100 cp).

The transitional term "comprising," which is synonymous with "including," or "containing," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention.

Unless specifically stated or obvious from context, as used herein, the term "or" is understood to be inclusive. Unless specifically stated or obvious from context, as used herein, the terms "a," "an" and "the" understood to be singular or plural.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value.

The recitation of a listing of chemical groups in any definition of a variable herein includes definitions of that variable as any single group or combination of listed groups. The recitation of an embodiment for a variable or aspect herein includes that embodiment as any single embodiment or in combination with any other embodiments or portions thereof.

All references cited herein are hereby incorporated by reference in their entirety.

Methods of Upgrading Heavy Oil and Converting Heavy Hydrocarbon Substances

The subject invention provides compositions and methods for improving oil production by, for example, improving the quality of crude oil either within an oil-bearing formation or after the oil has been recovered from an oil well. In specific embodiments, materials and methods are provided for upgrading heavy oil and/or converting heavy hydrocarbon substances, such as asphalt, asphaltenes, bitumens, tars and/or petcoke, including those in solid form, into lighter hydrocarbons with greater utility than their heavier predecessors.

In specific preferred embodiments, methods for upgrading heavy oil are provided, wherein a microbe-based composition comprising a cultivated yeast and/or a growth by-product thereof, is applied to the heavy oil or to an oil well containing heavy oil. The composition can be applied to crude oil in situ prior to its recovery from an oil well, e.g., by injecting it into an oil well. The composition can also be applied to crude oil after its recovery, for example, while the oil is being stored or transported.

Optionally, the method can further comprise applying an ionic or semi-ionic liquid, and/or a crude form or pure form biosurfactant. Furthermore, the method can optionally comprise subjecting the oil to cavitation.

As used herein, "upgrading," "converting," "treating," "improving the quality of" or "increasing the value of" heavy oil and/or hydrocarbons means changing the structure of the hydrocarbons and/or the contents of the oil in such a way as to increase its overall utility to consumers, and thus, its economic value to producers. For example, the BTU, i.e., energy or heat content, of the oil can be increased, thus increasing the economic value of heavy crude before it is sold to refineries. This can also benefit oil refineries, who can purchase less expensive heavy crude and convert it to a more usable product, such as, for example, road asphalt, using the subject methods and compositions. Upgrading can also involve increasing the API gravity (e.g., converting heavy and extra heavy oil to light oil, or to oil having API gravity from values lower than 12° (extra heavy oils) to values higher than 12° or even up to 30° to 310 or higher (light oils)), reducing viscosity (e.g., to values below 200 cp, below 150 cp, or even values below 100 cp, 50 cp, or lower), and/or reducing the impurities content of heavy hydrocarbons. Typical impurities found in heavy oil can include, for example, sulfur or hydrogen sulfide, ash, nitrogen, heavy metals, olefins, aromatics, naphthenes, and asphaltenes.

The subject invention can be used to reduce the viscosity of heavy oil, and/or increase the API gravity by 1%, 10%, 50%, 100%, 200% or greater. In one embodiment, the subject invention can upgrade extra heavy oils to heavy oils or light oils; or can upgrade heavy oils to light oils. The increase in API gravity can range from values lower than 12° to values higher than 120, preferably higher than 20°; from values lower than 20° to values higher than 20°, preferably 25° or higher, even more preferably 30° to 310 or higher.

In some embodiments, the subject methods utilize a microbe-based composition comprising a cultivated yeast strain and/or by-products of its growth. The composition can contain ingredients in amounts effective to sufficiently upgrade heavy oil and/or convert its heavy constituents, such as asphaltenes; to clean oil and gas wells, formations, and production, processing, transportation and/or refining equipment; to provide an effective coating on their surfaces to prevent future buildup of contaminants; to reduce the impurities content of the crude oil; and/or to reduce the viscosity of the crude oil to a desired level.

In preferred embodiments, the cultivated yeast strain of the subject compositions can be provided in the form of a yeast fermentation product. In one embodiment, the yeast fermentation product is obtained via cultivation of a biosurfactant-producing and/or metabolite-producing yeast, such as, for example, *Pichia anomala* (*Wickerhamomyces anomalus*). The yeast fermentation product can also be obtained via cultivation of a biosurfactant-producing and/or metabolite-producing yeast, such as, for example, *Starmerella bombicola*.

In one embodiment, the microbe-based composition utilizes other biochemical-producing microorganisms, including, e.g., those listed elsewhere in the present description.

The yeast-based composition can comprise yeast microbes and their growth by-products, or, the composition can comprise only yeast growth by-products with the microbes separated (i.e., removed) therefrom. The growth by-products can be any microbial metabolite, such as, for example, a biosurfactant.

When oil is being treated in situ, the yeasts of the yeast-based composition have preferably been separated from the composition. For example, a composition comprising one or more biosurfactants and one or more other microbial growth by-products (e.g., comprising the broth resulting from yeast cultivation) can be injected into a well or an oil-bearing formation to upgrade the heavy oil therein.

In other embodiments, with post-recovery treatment of oil, the yeast-based composition can comprise yeasts (either live or inactive) and growth by-products thereof, including the broth resulting from cultivation.

In certain embodiments, the microbe-based composition comprises biosurfactants. Biosurfactants accumulate at interfaces, thus reducing interfacial tension and leading to the formation of aggregated micellular structures in solution. Safe, effective microbial biosurfactants reduce the surface and interfacial tensions between the molecules of liquids, solids, and gases. In a specific embodiment, the biosurfactants are selected from glycolipid biosurfactants. Even more specifically, the biosurfactants of the subject compositions are sophorolipids (SLP).

The biosurfactants can be present in the composition as a result of microbial growth, i.e., they can be produced by the microorganisms of the microbe-based composition. Alternatively, or additionally, the biosurfactants can be added in a purified form and/or in a crude form (e.g., in the form of fermentation broth without being subjected to purification).

Crude form biosurfactants can take the form of a liquid mixture comprising biosurfactant sediment in fermentation broth resulting from cultivation of a biosurfactant-producing microbe. This crude form biosurfactant solution can comprise from about 25% to about 75%, from about 30% to about 70%, from about 35% to about 65%, from about 40% to about 60%, from about 45% to about 55%, or about 50% by weight of pure biosurfactant.

In one embodiment, the concentration of biosurfactant (crude solution or purified) in the composition is about 5.0 to about 30.0 g/L, more preferably about 10.0 g/L to about 20.0 g/L. In one embodiment, the concentration of crude biosurfactant is about 10 ml/L to 200 ml/L, about 20 ml/L to 175 ml/L, about 30 ml/L to 150 ml/l, about 40 ml/L to 125 ml/L, or about 50 ml/L to 100 ml/L, although preferably, about 50 ml/L.

In one embodiment, the composition comprises a biosurfactant at concentration of 0.01 to 90 weight % (wt %), preferably 0.1 to 50 wt %, and more preferably 0.1 to 20 wt %.

In some embodiments, a blend of biosurfactants is present. Preferably the blend comprises sophorolipids, and optionally, one or more of: a glycolipid, such as, for example, a mannosylerythritol lipid, trehalose lipid, and/or a rhamnolipid, and/or a lipopeptide, such as, for example, a surfactin, a fengycin, a lichenysin and/or an iturin.

In some embodiments, the composition further comprises an ionic or semi-ionic liquid. Ionic liquids can act as co-solvents and can prevent the formation of ring bonds in hydrocarbon compositions, which is one cause of hydrocarbon precipitation. Exemplary ionic liquids suitable for the subject cleaning composition include, but are not limited to, ethyl ammonium nitrate or glycerin/glycerol magnesium sulfate heptahydrate ($MgSO_4.7H_2O$).

In one embodiment, the ionic liquid is present at a concentration of about 1.0% to about 10.0% by weight, more preferably about 3.0 wt % to about 8.0 wt %, even more preferably about 5.0 wt % to about 6.0 wt % by weight. In one embodiment, the ionic liquid is present in the cleaning composition at a concentration of about 10 ml/L to 200 ml/L, about 20 ml/L to 175 ml/L, about 30 ml/L to 150 ml/l, about 40 ml/L to 125 ml/L, or about 50 ml/L to 100 ml/L.

In certain embodiments, use of yeast fermentation products according to the subject invention can be superior to, for example, purified microbial metabolites alone, due to, for example, the advantageous properties of the yeast cell walls. These properties include high concentrations of mannoprotein as a part of yeast cell wall's outer surface (mannoprotein is a highly effective bioemulsifier) and the presence of the biopolymer beta-glucan (also an effective emulsifier) in yeast cell walls. Additionally, the yeast fermentation product further can comprise biosurfactants in the culture and other metabolites (e.g., lactic acid, ethyl acetate, ethanol, etc.).

As used herein, "applying" a composition or product refers to contacting it with a target or site such that the composition or product can have an effect on that target or site. The effect can be due to, for example, microbial growth and/or the action of a biosurfactant, solvent and/or other microbial growth by-product. Thus, in one embodiment, the subject methods can comprise contacting a composition according to the subject invention with pipes, tanks, tubes, rods, pumps, equipment, and/or surfaces or materials. In one embodiment, the methods can comprise injecting the composition into horizontal, vertical, and/or fracking oil wells, into wellbores, into refinery separators, desalters or dehydrators, or into the piping, pumps, flowlines, storage tanks, etc. associated with oil wells and/or refineries. Even further, the method can comprise contacting the composition directly with crude oil and other heavy hydrocarbons, for example, if the oil is present in any of the above equipment or structures at the time of application.

Advantageously, the subject invention can be applied during all stages of the chain of operations, including exploration and production (E&P) operators (e.g., onshore and offshore wellbores, flowlines, and tanks), midstream (e.g., pipelines, tankers, transportation, storage tanks), and as part of refining (e.g., pre-refining treatment).

In one embodiment, a method of treating a working well, including the surrounding formation, includes the steps of pouring or injecting the composition down the casing side (back lines) of a well and allowing it to mix with the fluid that is already in the well. When enough fluid is present, the composition can then optionally be circulated by, for example, a pump for 24-72 hours, preferably 48-72 hours. Prior to circulating, the composition may be allowed to set for 8 to 24 hours, for example. The setting time, circulating time and dosage depend on the amount heavy oils, asphaltene, asphalt, tar, etc., anticipated to be present, as well as the depth and size of the well. A basic initial dosage can be, but is not limited to, 20 gallons of composition and for maintaining a clear structure, at least about 5 gallons of composition per well on periodic basis, e.g. biweekly, monthly, bimonthly.

In additional embodiments, the method may comprise applying a composition of the subject invention directly to equipment. For example, prior to placing rods and casings into gas and/or oil wells, these parts may be sprayed with, or soaked in, the composition. The parts may also be dipped into tanks filled with the composition.

The composition may be introduced by means of injection pumps into off-shore gas or oil wells. To treat the lines, from 40-50 gallons to 20-100 barrels, for example, of the composition can be dropped into the lines at an injection rate of, for example, 1 to 10 gallons per minute, or 1 to 10 barrels per minute.

In one embodiment, the subject invention can be used for treating heavy oil, for example, prior to refining or distillation. In another embodiment, the subject invention can be used for liquefying, dissolving or softening solidified or precipitated asphaltenes, or other heavy hydrocarbon substances, such as asphalts, tars, bitumens. In some embodiments, the heavy hydrocarbon substances were previously separated and/or recovered from heavy crude oil fluids. In yet another embodiment, the subject invention can be used as part of the refining process for treating resid and/or petcoke.

Advantageously, the subject invention can be effective for converting heavy elements of crude oil to more economically valuable elements. In some embodiments, the subject invention can convert, for example, asphaltenes, asphalts, tar, bitumens and/or petcokes into more valuable and useful components, such as lighter hydrocarbon substances, without degrading the crude oil into methane or other gases. This can be achieved in, for example, 12 hours or less, preferably in 8 to 12 hours. The heavy hydrocarbon substances can be converted into a flammable, soluble form, with greater utility over their less flammable solid states. Additionally, heavy hydrocarbon precipitate that would otherwise be disposed of as waste can be made valuable again by dissolving the precipitate back into liquid solution either in situ in the well or in storage tanks after extraction.

The composition may also be applied to formations containing heavy crude oil. Advantageously, the subject invention can reduce the viscosity and increase the API gravity of heavy crudes, as well as reduce or eliminate the need for steam injection and other thermal, chemical and mechanical methods of heavy oil extraction. Further reduced or eliminated are the need for diluents (e.g., light or refined crude oil) and water jackets to help move heavy crude through pipelines. Even further, with the reduction of heavy oil viscosity, transportation of oil is less complicated or costly, as the need for tanker trucks and storage tanks is reduced and the use of pipeline transport becomes more feasible.

If desired, however, the subject compositions and methods can be used to supplement and/or enhance, or can be supplemented and/or enhanced by, existing mechanical, thermal and/or chemical treatments.

In one embodiment, the subject methods further comprises the step of subjecting the heavy oil to cavitation either immediately prior to, simultaneously with, and/or sometime after the subject microbe-based composition has been applied to the heavy oil. The cavitation can be effected using machinery known in the art, for example, hydrodynamic or ultrasonic cavitation methods.

As used herein, "cavitation" in the context of treating heavy oil means the formation, growth, and collapse or implosion of gas or vapor filled bubbles in liquids. Cavitation requires the presence of small and transient microcavities or microbubbles of vapor or gas, which grow and then implode or collapse. During cavitation of heavy oil, a portion of the liquid comprising the heavy oil is in the form of a gas, which is dispersed as bubbles in the liquid portion. The process effectively destructures the molecular arrangement of heavy hydrocarbons in oil (e.g., asphaltenes, which can form highly associative and cohesive aggregates), thereby reducing its viscosity.

The cavitation step according to the subject methods can be applied to heavy crude oil at any point during the oil recovery and transport chain of operation in order to prevent or reduce sedimentation of heavy hydrocarbons in the crude fluids, for example, after recovery from a well and before being placed in a collection tank; during storage; after storage in a collection tank and before being transported in a tanker; during transportation; and before the refining process. Cavitation machinery can be attached to a storage tank, tanker truck, pump system, piping, tubing, and/or any other equipment used for transport, transmission and/or storage of crude oil.

In one embodiment, the methods can be used to upgrade oil that has been recovered from oil sands and/or from a remediation site (e.g., an oil spill).

In certain embodiments, the present invention can be used for the liquefaction and/or dispersal of precipitated and/or solid asphaltene and/or other heavy hydrocarbon substances that might act as contaminants on the surfaces of equipment, thus allowing for efficient removal of these contaminants from the crude oil and from equipment.

In one embodiment, the subject invention can be used for preventing heavy hydrocarbons from precipitating and/or depositing onto surfaces. Dispersal, or dissolution, of precipitates decreases the concentration of contaminants available in the oil to deposit on or in the oil and gas equipment. Thus, the present invention allows for delaying or completely removing the necessity for preventative maintenance related to removing precipitates and deposits, as well as the need for replacing or repairing equipment parts.

In some embodiments, it may be desirable to introduce the composition through perforations in the casing, into the surrounding formation. The composition may be forced into the surrounding formation by applied pressure or, if the composition is allowed to set at the bottom of the casing, the composition may seep into the formation without additional pressure. The composition permeates the formation, dissolving blockages in the formation to provide more efficient oil and gas recovery.

The microbe-based product may be applied with a composition that promotes adherence of the microbe-based product to a surface to be treated. The adherence-promoting substance may be a component of the microbe-based product or it may be applied simultaneously with, or sequentially with, the microbe-based product. Adherence-promoters can include organic or inorganic particles, ions such as calcium, magnesium, phosphate, and sodium, iron, carbon sources that are metabolized to acetyl coenzyme A, acetyl phosphate, and acetate.

Advantageously, the subject invention is environmentally friendly in that it can reduce greenhouse gas emissions related to the extraction, transport and refining of heavy crude oil, for example, by 50%, when compared to existing operations. This is mainly due to a reduction in the energy required for transportation and hauling via fuel-burning trucks; however, reduction in methane released during treatment of oil, and reduced exhaust from engines, turbines and fired heaters in extraction and refining of heavy oils also contribute to the reduction in greenhouse gas emissions.

Local Production of Microorganisms

The subject invention provides methods for cultivation of microorganisms and production of microbial metabolites and/or other by-products of microbial growth. In one embodiment, the subject invention provides materials and methods for the production of biomass (e.g., viable cellular material), extracellular metabolites (e.g. small molecules and excreted proteins), residual nutrients and/or intracellular components (e.g. enzymes and other proteins).

In certain embodiments, a microbe growth facility produces fresh, high-density microorganisms and/or microbial growth by-products of interest on a desired scale. The microbe growth facility may be located at or near the site of application. The facility produces high-density microbe-based compositions in batch, quasi-continuous, or continuous cultivation.

The microbe growth facilities of the subject invention can be located at the location where the microbe-based product will be used (e.g., at an oil well) For example, the microbe growth facility may be less than 300, 250, 200, 150, 100, 75, 50, 25, 15, 10, 5, 3, or 1 mile from the location of use.

The microbe growth facilities can produce fresh, microbe-based compositions, comprising the microbes themselves, microbial metabolites, and/or other components of the broth in which the microbes are grown. If desired, the compositions can have a high density of vegetative or inactive cells or a mixture of vegetative cells, spores, conidia, mycelia and/or other microbial propagules. Advantageously, the compositions can be tailored for use at a specified location. In one embodiment, the microbe growth facility is located on, or near, a site where the microbe-based products will be used.

Advantageously, in preferred embodiments, the methods of the subject invention harness the power of naturally-occurring local microorganisms and their metabolic by-products to improve oil production, transmission and/or refining. Local microbes can be identified based on, for example, salt tolerance, ability to grow at high temperatures, and the use of genetic identification of the sequences described herein.

The microbe growth facilities provide manufacturing versatility by their ability to tailor the microbe-based products to improve synergies with destination geographies. The microbe growth facilities may operate off the grid by utilizing, for example, solar, wind and/or hydroelectric power. Thus, the microbe-based compositions can be produced in remote locations.

The growth vessel used for growing microorganisms can be any fermenter or cultivation reactor for industrial use. In one embodiment, the vessel may have functional controls/sensors or may be connected to functional controls/sensors to measure important factors in the cultivation process, such as pH, oxygen, pressure, temperature, agitator shaft power, humidity, viscosity and/or microbial density and/or metabolite concentration.

In a further embodiment, the vessel may also be able to monitor the growth of microorganisms inside the vessel (e.g., measurement of cell number and growth phases). Alternatively, a daily sample may be taken from the vessel and subjected to enumeration by techniques known in the art, such as dilution plating technique. Dilution plating is a simple technique used to estimate the number of microbes in a sample. The technique can also provide an index by which different environments or treatments can be compared.

In one embodiment, the method includes supplementing the cultivation with a nitrogen source. The nitrogen source can be, for example, potassium nitrate, ammonium nitrate ammonium sulfate, ammonium phosphate, ammonia, urea, and/or ammonium chloride. These nitrogen sources may be used independently or in a combination of two or more.

The method can provide oxygenation to the growing culture. One embodiment utilizes slow motion of air to remove low-oxygen containing air and introduce oxygenated air. The oxygenated air may be ambient air supplemented daily through mechanisms including impellers for mechanical agitation of the liquid, and air spargers for supplying bubbles of gas to the liquid for dissolution of oxygen into the liquid.

The method can further comprise supplementing the cultivation with a carbon source. The carbon source is typically a carbohydrate, such as glucose, sucrose, lactose, fructose, trehalose, mannose, mannitol, and/or maltose; organic acids such as acetic acid, fumaric acid, citric acid, propionic acid, malic acid, malonic acid, and/or pyruvic acid; alcohols such as ethanol, isopropyl, propanol, butanol, pentanol, hexanol, isobutanol, and/or glycerol; fats and oils such as soybean oil, rice bran oil, canola oil, olive oil, corn oil, sesame oil, and/or linseed oil; etc. These carbon sources may be used independently or in a combination of two or more.

In a preferred embodiment, the method comprises use of two carbon sources, one of which is a saturated oil selected from canola, vegetable, corn, coconut, olive, or any other oil suitable for use in, for example, cooking. In a specific embodiment, the saturated oil is 15% canola oil or discarded oil that has been used for cooking.

In one embodiment, growth factors and trace nutrients for microorganisms are included in the medium. This is particularly preferred when growing microbes that are incapable of producing all of the vitamins they require. Inorganic nutrients, including trace elements such as iron, zinc, copper, manganese, molybdenum and/or cobalt may also be included in the medium. Furthermore, sources of vitamins, essential amino acids, and microelements can be included, for example, in the form of flours or meals, such as corn flour, or in the form of extracts, such as yeast extract, potato extract, beef extract, soybean extract, banana peel extract, and the like, or in purified forms. Amino acids such as, for example, those useful for biosynthesis of proteins, can also be included, e.g., L-Alanine.

In one embodiment, inorganic salts may also be included. Usable inorganic salts can be potassium dihydrogen phosphate, dipotassium hydrogen phosphate, disodium hydrogen phosphate, magnesium sulfate, magnesium chloride, iron sulfate, iron chloride, manganese sulfate, manganese chloride, zinc sulfate, lead chloride, copper sulfate, calcium chloride, calcium carbonate, sodium chloride and/or sodium carbonate. These inorganic salts may be used independently or in a combination of two or more.

In some embodiments, the method for cultivation may further comprise adding additional acids and/or antimicrobials in the liquid medium before and/or during the cultivation process. Antimicrobial agents or antibiotics are used for protecting the culture against contamination. Additionally, antifoaming agents may also be added to prevent the formation and/or accumulation of foam when gas is produced during cultivation.

The pH of the mixture should be suitable for the microorganism of interest. Buffers, and pH regulators, such as carbonates and phosphates, may be used to stabilize pH near a preferred value. When metal ions are present in high concentrations, use of a chelating agent in the liquid medium may be necessary.

The method and equipment for cultivation of microorganisms and production of the microbial by-products can be performed in a batch, quasi-continuous, or continuous processes.

In one embodiment, the method for cultivation of microorganisms is carried out at about 5° to about 100° C., preferably, 15 to 60° C., more preferably, 25 to 50° C. In a further embodiment, the cultivation may be carried out continuously at a constant temperature. In another embodiment, the cultivation may be subject to changing temperatures.

In one embodiment, the equipment used in the method and cultivation process is sterile. The cultivation equipment such as the reactor/vessel may be separated from, but connected to, a sterilizing unit, e.g., an autoclave. The cultivation equipment may also have a sterilizing unit that sterilizes in situ before starting the inoculation. Air can be sterilized by methods know in the art. For example, the ambient air can pass through at least one filter before being introduced into the vessel. In other embodiments, the medium may be pasteurized or, optionally, no heat at all added, where the use of low water activity and low pH may be exploited to control bacterial growth.

In one embodiment, the subject invention provides methods of producing a microbial metabolite by cultivating a microbe strain of the subject invention under conditions appropriate for growth and production of the metabolite; and purifying the metabolite. In a specific embodiment, the metabolite is a biosurfactant. The metabolite may also be, for example, ethanol, lactic acid, beta-glucan, proteins, amino acids, toxins, peptides, metabolic intermediates, polyunsaturated fatty acids, and lipids. The metabolite content produced by the method can be, for example, at least 20%, 30%, 40%, 50%, 60%, 70%, 80%, or 90%.

The biomass content of the fermentation broth may be, for example from 5 g/l to 180 g/l or more. In one embodiment, the solids content of the broth is from 10 g/l to 150 g/l.

The microbial growth by-product produced by microorganisms of interest may be retained in the microorganisms or secreted into the liquid medium. In another embodiment, the method for producing microbial growth by-product may further comprise steps of concentrating and purifying the microbial growth by-product of interest. In a further embodiment, the liquid medium may contain compounds that stabilize the activity of microbial growth by-product.

In one embodiment, all of the microbial cultivation composition is removed upon the completion of the cultivation (e.g., upon, for example, achieving a desired cell density, or density of a specified metabolite in the broth). In this batch procedure, an entirely new batch is initiated upon harvesting of the first batch.

In another embodiment, only a portion of the fermentation product is removed at any one time. In this embodiment, biomass with viable cells remains in the vessel as an inoculant for a new cultivation batch. The composition that is removed can be a microbe-free broth or contain cells, spores, mycelia, conidia or other reproductive propagules. In this manner, a quasi-continuous system is created.

Advantageously, the methods of cultivation do not require complicated equipment or high energy consumption. The microorganisms of interest can be cultivated at small or large scale on site and utilized, even being still-mixed with their media. Similarly, the microbial metabolites can also be produced at large quantities at the site of need.

Because the microbe-based products can be generated locally, without resort to the microorganism stabilization, preservation, storage and transportation processes of conventional microbial production, a much higher density of live microbes, spores, mycelia, conidia or other microbial propagules can be generated, thereby requiring a smaller volume of the microbe-based product for use in the on-site application or which allows much higher density microbial applications where necessary to achieve the desired efficacy. This allows for a scaled-down bioreactor (e.g., smaller fermentation tank, smaller supplies of starter material, nutrients, pH control agents, and defoaming agents), which makes the system efficient. Local generation of the microbe-based product also facilitates the inclusion of the growth broth in the product. The broth can contain agents produced during the fermentation that are particularly well-suited for local use.

Locally-produced high density, robust cultures of microbes are more effective in the field than those that have undergone vegetative cell stabilization, have been sporulated or have sat in the supply chain for some time. The microbe-based products of the subject invention are particularly advantageous compared to traditional products wherein cells, spores, mycelia, conidia and/or other microbial propagules have been separated from metabolites and nutrients present in the fermentation growth media. Reduced transportation times allow for the production and delivery of fresh batches of microbes and/or their metabolites at the time and volume as required by local demand.

Advantageously, these microbe growth facilities provide a solution to the current problem of relying on far-flung industrial-sized producers whose product quality suffers due to upstream processing delays, supply chain bottlenecks, improper storage, and other contingencies that inhibit the timely delivery and application of, for example, a viable, high cell- and/or propagule-count product and the associated broth and metabolites in which the microbes are originally grown.

Local production and delivery within, for example, 24 hours of fermentation results in pure, high cell density compositions and substantially lower shipping costs. Given the prospects for rapid advancement in the development of more effective and powerful microbial inoculants, consumers will benefit greatly from this ability to rapidly deliver microbe-based products.

Preparation of Microbe-Based Products

The subject invention provides microbe-based products (e.g., yeast fermentation products) for use in improving the quality of oil, stimulating oil wells, and/or improving oil production efficiency. One microbe-based product of the subject invention is simply the fermentation broth containing the microorganism and/or the microbial metabolites produced by the microorganism and/or any residual nutrients. The product of fermentation may be used directly without extraction or purification. If desired, extraction and purification can be easily achieved using standard extraction and/or purification methods or techniques described in the literature.

The microorganisms in the microbe-based product may be in an active or inactive form. Furthermore, the yeast cells can optionally be separated from the composition altogether.

The microbe-based products may be used without further stabilization, preservation, and storage. Advantageously, direct usage of these microbe-based products preserves a high viability of the microorganisms, reduces the possibility of contamination from foreign agents and undesirable microorganisms, and maintains the activity of the by-products of microbial growth.

The microbes and/or broth resulting from the microbial growth can be removed from the growth vessel and transferred via, for example, piping for immediate use.

In one embodiment, the microbe-based product is simply the growth by-products of the microorganism. For example, biosurfactants produced by a microorganism can be collected from the fermentation vessel in crude form, comprising, for example about 50% pure biosurfactant in liquid broth.

In other embodiments, the microbe-based product (microbes, broth, or microbes and broth) can be placed in containers of appropriate size, taking into consideration, for example, the intended use, the contemplated method of application, the size of the fermentation tank, and any mode of transportation from microbe growth facility to the location of use. Thus, the containers into which the microbe-based composition is placed may be, for example, from 1 gallon to 1,000 gallons or more. In other embodiments the containers are 2 gallons, 5 gallons, 25 gallons, or larger.

In one embodiment, the yeast fermentation product according to the subject composition comprises a yeast strain and/or growth by-products thereof.

In one exemplary embodiment, a yeast fermentation product can be obtained via cultivation of the killer yeast, *Wickerhamomyces anomalus* in medium containing necessary sources of carbon, nitrogen, minerals and optionally, antimicrobial substances to prevent contaminating bacterial growth. The culture can be grown with an additional carbon source, particularly, a saturated oil (e.g., 15% canola oil, or used cooking vegetable oil). Typically, the pH begins at 5.0-5.5, then decreases to 3.0-3.5, where it is stabilized. The fermentation broth, which can be harvested after, for example, 20-24 hours of cultivation at 25-30° C., comprises the yeast fermentation product.

In certain embodiments, use of yeast fermentation products according to the subject invention can be superior to, for example, purified microbial metabolites alone, due to, for example, the advantageous properties of the yeast cell walls. These properties include high concentrations of mannoprotein as a part of yeast cell wall's outer surface (mannoprotein is a highly effective bioemulsifier) and the presence of biopolymer beta-glucan (an emulsifier) in yeast cell walls. Additionally, the yeast fermentation product further can comprise biosurfactants in the culture, which are capable of reducing both surface and interfacial tension, and other metabolites (e.g., lactic acid, ethyl acetate, ethanol, etc.) in the culture.

Upon harvesting the yeast-based composition from the growth vessels, further components can be added as the harvested product is placed into containers and/or piped (or otherwise transported for use). The additives can be, for example, buffers, carriers, other microbe-based compositions produced at the same or different facility, viscosity modifiers, preservatives, nutrients for microbe growth, tracking agents, solvents, biocides, other microbes and other ingredients specific for an intended use.

Other suitable additives, which may be contained in the formulations according to the invention, include substances that are customarily used for such preparations. Examples of such additives include surfactants, emulsifying agents, lubricants, buffering agents, solubility controlling agents, pH adjusting agents, preservatives, stabilizers and ultra-violet light resistant agents.

In one embodiment, the product may further comprise buffering agents including organic and amino acids or their salts. Suitable buffers include citrate, gluconate, tartarate, malate, acetate, lactate, oxalate, aspartate, malonate, glucoheptonate, pyruvate, galactarate, glucarate, tartronate, glutamate, glycine, lysine, glutamine, methionine, cysteine, arginine and a mixture thereof. Phosphoric and phosphorous acids or their salts may also be used. Synthetic buffers are suitable to be used but it is preferable to use natural buffers such as organic and amino acids or their salts listed above.

In a further embodiment, pH adjusting agents include potassium hydroxide, ammonium hydroxide, potassium carbonate or bicarbonate, hydrochloric acid, nitric acid, sulfuric acid or a mixture.

In one embodiment, additional components such as an aqueous preparation of a salt as polyprotic acid such as sodium bicarbonate or carbonate, sodium sulfate, sodium phosphate, sodium biphosphate, can be included in the formulation.

Up to, for example, 50 wt. % or more of additives may be added, as needed, for particular applications, such as to vary the VOC levels, increase penetration of the mixture, decrease viscosity of the mixture, as couplers for solvent insolubles in the mixture, and to provide solvents.

Suitable additives include non-biological surfactants, terpenes, terpene alcohols, C8-C14 alcohol ester blends, glycols, glycol ethers, acid esters, diacid esters, petroleum hydrocarbons, amino acids, alkanolamines, and amines, preferably, methyl or isobutyl esters of C4-C6 aliphatic dibasic esters and n-methyl-2 pyrolidone.

Non-biological surfactants that can be used according to the subject methods include, but are not limited to: anionic surfactants, ammonium lauryl sulfate, sodium lauryl sulfate (also called SDS, sodium dodecyl sulfate), alkyl-ether sulfates sodium laureth sulfate (also known as sodium lauryl ether sulfate (SLES)), sodium myreth sulfate; docusates, dioctyl sodium sulfosuccinate, perfluorooctanesulfonate (PFOS), perfluorobutanesulfonate, linear alkylbenzene sulfonates (LABs), alkyl-aryl ether phosphates, alkyl ether phosphate; carboxylates, alkyl carboxylates (soaps), sodium stearate, sodium lauroyl sarcosinate, carboxylate-based fluorosurfactants, perfluorononanoate, perfluorooctanoate; cationic surfactants, pH-dependent primary, secondary, or tertiary amines, octenidine dihydrochloride, permanently charged quaternary ammonium cations, alkyltrimethylammonium salts, cetyl trimethylammonium bromide (CTAB) (a.k.a. hexadecyl trimethyl ammonium bromide), cetyl trimethylammonium chloride (CTAC), cetylpyridinium chloride (CPC), benzalkonium chloride (BAC), benzethonium chloride (BZT), 5-Bromo-5-nitro-1,3-dioxane, dimethyldioctadecylammonium chloride, cetrimonium bromide, dioctadecyldi-methylammonium bromide (DODAB); zwitterionic (amphoteric) surfactants, sultaines CHAPS (3-[(3-Cholamidopropyl)dimethylammonio]-1-propanesulfonate), cocamidopropyl hydroxysultaine, betaines, cocamidopropyl betaine, phosphatidylserine, phosphatidylethanolamine, phosphatidylcholine, sphingomyelins, ethoxylate, long chain alcohols, fatty alcohols, cetyl alcohol, stearyl alcohol, cetostearyl alcohol, oleyl alcohol, polyoxyethylene glycol alkyl ethers (Brij): CH3-(CH2)10-16-(O—C2H4)1-25-OH (octaethylene glycol monododecyl ether, pentaethylene glycol monododecyl ether), polyoxypropylene glycol alkyl ethers: CH3-(CH2)10-16-(O—C3H6)1-25-OH, glucoside alkyl ethers: CH3-(CH2)10-16-(O-Glucoside)1-3-OH (decyl glucoside, lauryl glucoside, octyl glucoside), polyoxyethylene glycol octylphenol ethers: C8H17-(C6H4)—(O—C2H4)1-25-OH (Triton X-100), polyoxyethylene glycol alkylphenol ethers: C9H19-(C6H4)—(O—C2H4)1-25-OH (nonoxynol-9), glycerol alkyl esters (glyceryl laurate), polyoxyethylene glycol sorbitan alkyl esters (polysorbate), sorbitan alkyl esters (spans), cocamide MEA, cocamide DEA, dodecyldimethylamine oxide, copolymers of polyethylene glycol and polypropylene glycol (poloxamers), and polyethoxylated tallow amine (POEA).

Anionic surfactants contain anionic functional groups at their head, such as sulfate, sulfonate, phosphate, and carboxylates. Prominent alkyl sulfates include ammonium lauryl sulfate, sodium lauryl sulfate (also called SDS, sodium dodecyl sulfate) and the related alkyl-ether sulfates sodium laureth sulfate, also known as sodium lauryl ether sulfate (SLES), and sodium myreth sulfate. Carboxylates are the most common surfactants and comprise the alkyl carboxylates (soaps), such as sodium stearate.

Surfactants with cationic head groups include: pH-dependent primary, secondary, or tertiary amines; octenidine dihydrochloride; permanently charged quaternary ammonium cations such as alkyltrimethylammonium salts: cetyl trimethylammonium bromide (CTAB) a.k.a. hexadecyl trimethyl ammonium bromide, cetyl trimethylammonium chloride (CTAC); cetylpyridinium chloride (CPC); benzalkonium chloride (BAC); benzethonium chloride (BZT); 5-Bromo-5-nitro-1,3-dioxane; dimethyldioctadecylammonium chloride; cetrimonium bromide; and dioctadecyldi-methylammonium bromide (DODAB).

Zwitterionic (amphoteric) surfactants have both cationic and anionic centers attached to the same molecule. The cationic part is based on primary, secondary, or tertiary amines or quaternary ammonium cations. The anionic part can be more variable and include sulfonates. Zwitterionic surfactants commonly have a phosphate anion with an amine or ammonium, such as is found in the phospholipids phosphatidylserine, phosphatidylethanolamine, phosphatidylcholine, and sphingomyelins.

A surfactant with a non-charged hydrophilic part, e.g. ethoxylate, is non-ionic. Many long chain alcohols exhibit some surfactant properties.

Examples of terpenes include d-limonene and a and P pinene and terpene alcohols, including a terpineol. C8-C14 alcohol ester blends include EXXATE 900, 1000, 1200 from Exxon Chemical; glycols include propylene glycol, dipropylene glycol, and tripropylene glycol; and glycol ethers include dipropylene glycol monomethyl ether, propylene glycol monomethyl ether, propylene glycol-n-butyl ether, ethylene glycol monobutyl ether, and diethylene glycol monobutyl ether. Acid esters include methyl oleate and methyl linoleate, and diacid esters include methyl or butyl diesters of glutaric, adipic, and succinic acids. Petroleum hydrocarbons include AROMATIC 100, AROMATIC 150 ISOPAR M, and ISOPAR K.

Amines such as morpholine; 1,3-dimethyl-2-imidazolidinone; 1, 3-propanediamine; 2-amino-1,3-propanediol; and 3-amino propanol; as well as alkanolamines such as triethanolamine, diethanolamine, 2-aminomethyl propanol, and monoethanolamine act as dispersants for contaminants and solubilize fatty acids and oils. Amino acids, provide non-toxic alternatives to monoethanolamine, and act as metal chelators. Methyl or isobutylesters of C4-C6 aliphatic dibasic esters and n-methyl-2 pyrolidone are also useful.

Other additives typically used in cleaning compositions may be used, including water softening agents, non-biological surfactants, sequesterants, corrosion inhibitors, and antioxidants, which are added in amounts effective to perform their intended function. These additives and amounts thereof are well within the skill of the art. Suitable water softening agents include linear phosphates, styrene-maleic acid co-polymers, and polyacrylates. Suitable sequesterants include 1,3-dimethyl-2-immidazolidinone; 1-phenyl-3-isoheptyl-1, 3-propanedione; and 2 hydroxy-5-nonylacetophenoneoxime. Examples of corrosion inhibitors include 2-aminomethyl propanol, diethylethanolamine benzotraizole, and methyl benzotriazole. Antioxidants suitable for the present invention include (BHT) 2,6-di-tert-butyl-para-cresol, (BHA) 2,6-di-tert-butyl-para-anisole, Eastman inhibitor O A BM-oxalyl bis (benzylidenehydrazide), and Eastman DTBMA 2,5-di-tert-butylhydroquinone.

Advantageously, in accordance with the subject invention, the microbe-based product may comprise broth in which the microbes were grown. The product may be, for example, at least, by weight, 1%, 5%, 10%, 25%, 50%, 75%, or 100% broth. The amount of biomass in the product, by weight, may be, for example, anywhere from 0% to 100% inclusive of all percentages therebetween.

Optionally, the product can be stored prior to use. The storage time is preferably short. Thus, the storage time may be less than 60 days, 45 days, 30 days, 20 days, 15 days, 10 days, 7 days, 5 days, 3 days, 2 days, 1 day, or 12 hours. In a preferred embodiment, if live cells are present in the product, the product is stored at a cool temperature such as, for example, less than 20° C., 15° C., 10° C., or 5° C. On the other hand, a biosurfactant composition can typically be stored at ambient temperatures.

Microbial Strains Grown in Accordance with the Subject Invention

The microorganisms grown according to the systems and methods of the subject invention can be, for example, bacteria, yeast and/or fungi. These microorganisms may be natural, or genetically modified microorganisms. For example, the microorganisms may be transformed with specific genes to exhibit specific characteristics. The microorganisms may also be mutants of a desired strain. As used herein, "mutant" means a strain, genetic variant or subtype of a reference microorganism, wherein the mutant has one or more genetic variations (e.g., a point mutation, missense mutation, nonsense mutation, deletion, duplication, frameshift mutation or repeat expansion) as compared to the reference microorganism. Procedures for making mutants are well known in the microbiological art. For example, UV mutagenesis and nitrosoguanidine are used extensively toward this end.

In preferred embodiments, the microorganism is any yeast or fungus. Yeast and fungus species suitable for use according to the current invention, include Acaulospora, *Aspergillus, Aureobasidium* (e.g., *A. pullulans*), *Blakeslea, Candida* (e.g., *C. albicans, C. apicola*), *Debaryomyces* (e.g., *D. hansenii*), *Entomophthora, Fusarium, Hanseniaspora* (e.g., *H. uvarum*), *Hansenula, Issatchenkia, Kluyveromyces, Mortierella, Mucor* (e.g., *M. piriformis*), *Penicillium, Phythium, Phycomyces, Pichia* (e.g., *P. anomala, P. guielliermondii, P. occidentalis, P. kudriavzevii*), *Pseudozyma* (e.g., *P. aphidis*), *Rhizopus, Saccharomyces* (*S. cerevisiae, S. boulardii sequela, S. torula*), *Starmerella* (e.g., *S. bombicola*), *Torulopsis, Thraustochytrium, Trichoderma* (e.g., *T. reesei, T. harzianum, T. virens*), *Ustilago* (e.g., *U. maydis*), *Wickerhamomyces* (e.g., *W anomalus*), *Williopsis, Zygosaccharomyces* (e.g., *Z. bailii*).

In one embodiment, the microorganism is any yeast known as a "killer yeast." As used herein, "killer yeast" means a strain of yeast characterized by its secretion of toxic proteins or glycoproteins, to which the strain itself is immune. The exotoxins secreted by killer yeasts are capable of killing other strains of yeast, fungi, or bacteria. For example, microorganisms that can be controlled by killer yeast include *Fusarium* and other filamentous fungi. Such yeasts can include, but are not limited to, *Wickerhamomyces, Pichia, Hansenula, Saccharomyces, Hanseniaspora, Ustilago Debaryomyces, Candida, Cryptococcus, Kluyveromyces, Torulopsis, Williopsis, Zygosaccharomyces* and others.

In preferred embodiments, the microbes may be chosen from strains of killer yeast. In even more preferred embodiments, the microbes are *Wickerhamomyces anomalus* strains.

*Wickerhamomyces anomalus*, also known as *Pichia anomala*, is frequently associated with food and grain production. *W. anomalus* produces a killer toxin comprising exo-3-1,3-glucanase. Additionally, W *anomalus* produces biosurfactants that are capable of reducing surface/interfacial tension of water, as well as various other useful solvents, enzymes and metabolites, such as phytase, ethyl acetate, acetic acid, lactic acid, isopropyl alcohol and ethanol.

In one embodiment, the microbe is *Starmerella bombicola*, which is an effective producer of SLP.

Other microbial strains can be used in accordance with the subject invention, including, for example, any other yeast and/or fungal strains having high concentrations of mannoprotein and/or beta-glucan in their cell walls and/or that are capable of producing biosurfactants and other metabolites such as, e.g., lactic acid, ethyl acetate and ethanol.

EXAMPLES

A greater understanding of the present invention and of its many advantages may be had from the following examples, given by way of illustration. The following examples are illustrative of some of the methods, applications, embodiments and variants of the present invention. They are not to be considered as limiting the invention. Numerous changes and modifications can be made with respect to the invention.

Example 1—Liquefaction of Precipitated Asphaltene Using Yeast-Based Composition

Fully precipitated and hardened asphaltene from an oil refinery is liquefied using a yeast-based composition of the subject invention. As shown in FIGS. 1-7, solutions of yeast products (500 ml), purified SLP and ionic liquid are compared with respect to ability to liquefy 100 g of asphaltene precipitate in shaker flasks.

Figure 1A:
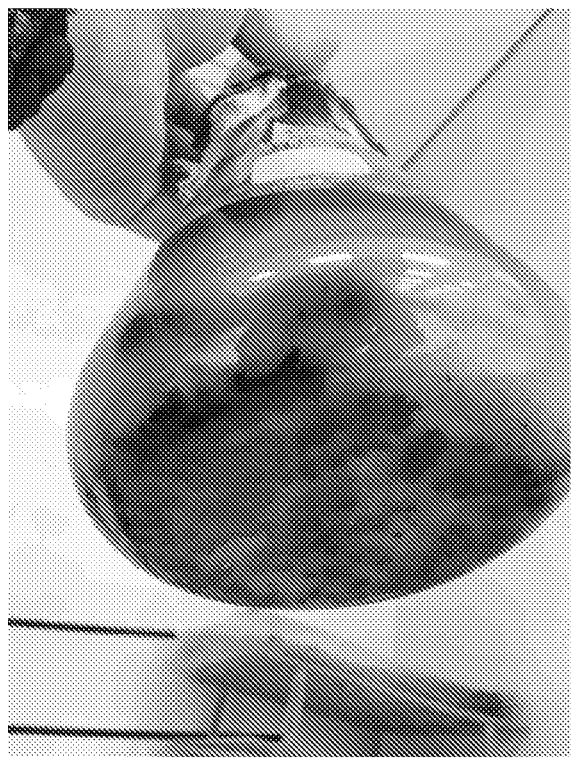
FIGS. 1A-1B show 100 g of asphaltene precipitate in yeast product with SLP in 5% ionic solution prior to shaking. 1A shows the treatment vial from below, with the precipitate visible as dark solids settled at the bottom. 1B shows the same treatment vial from the side.
Figure 1B:
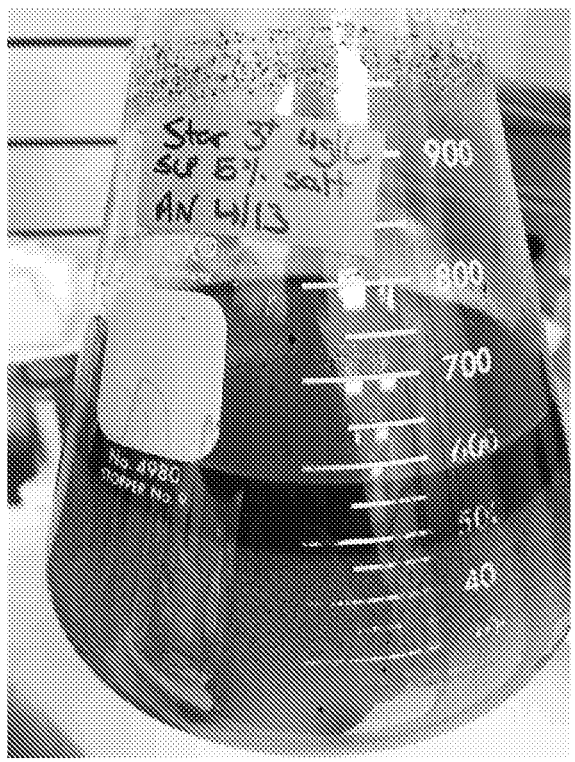
Figure 2A:
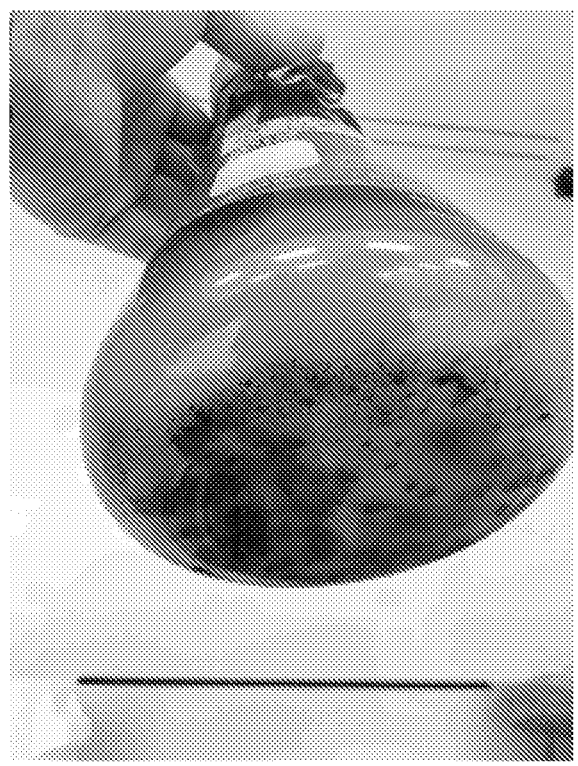
FIGS. 2A-2B show 100 g of asphaltene precipitate in yeast product with SLP and 1% ionic solution prior to shaking. 2A shows the treatment vial from below, with the precipitate visible as dark solids settled at the bottom. 2B shows the same treatment vial from the side.
Figure 2B:
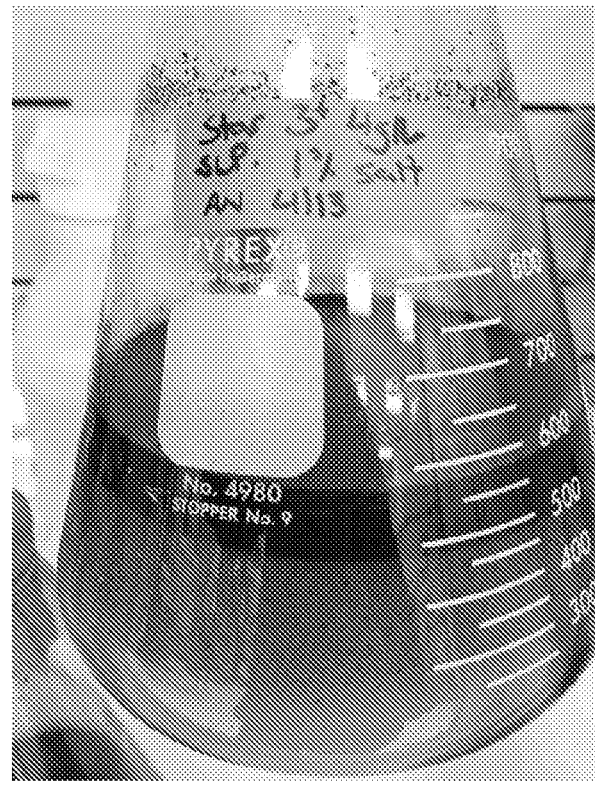
Figure 3A:
FIGS. 3A-3B show 100 g of asphaltene precipitate in yeast product with SLP prior to shaking. 3A shows the treatment vial from below, with the precipitate visible as dark solids settled at the bottom. 3B shows the same treatment vial from the side.
Figure 3B:
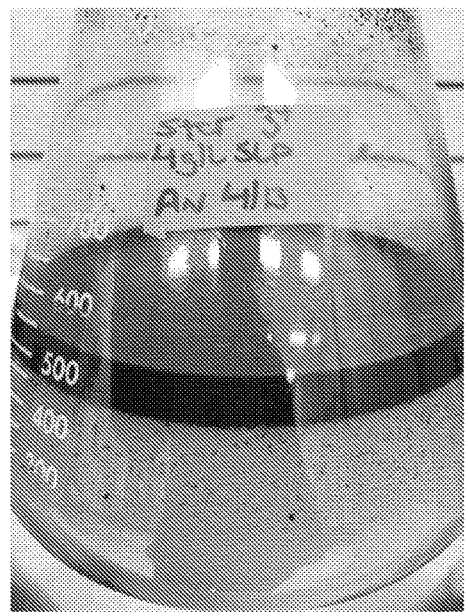
Figure 4A:
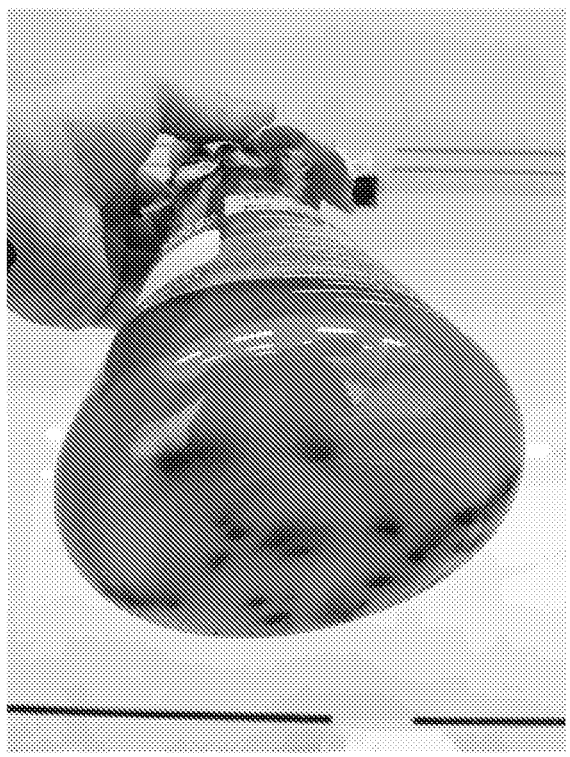
FIGS. 4A-4B show 100 g of asphaltene precipitate in yeast treatment alone prior to shaking. 4A shows the treatment vial from below, with the precipitate visible as dark solids settled at the bottom. 4B shows the same treatment vial from the side.
Figure 4B:
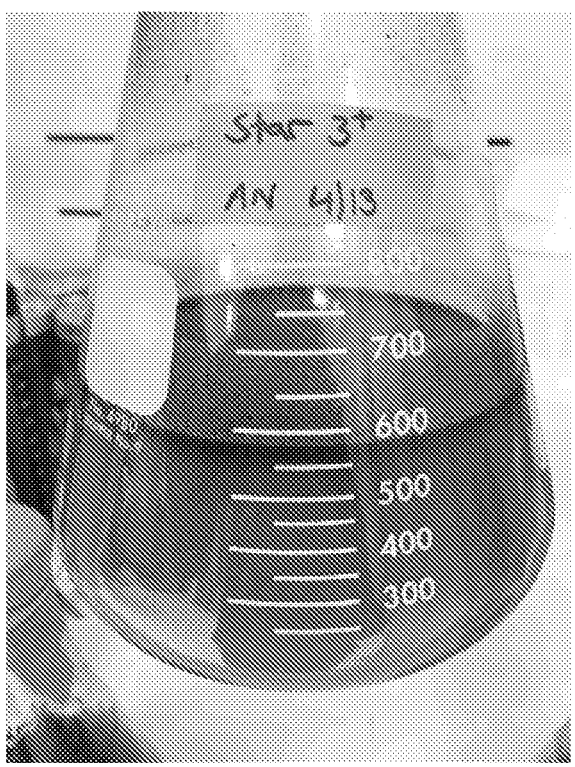
Figure 5A:
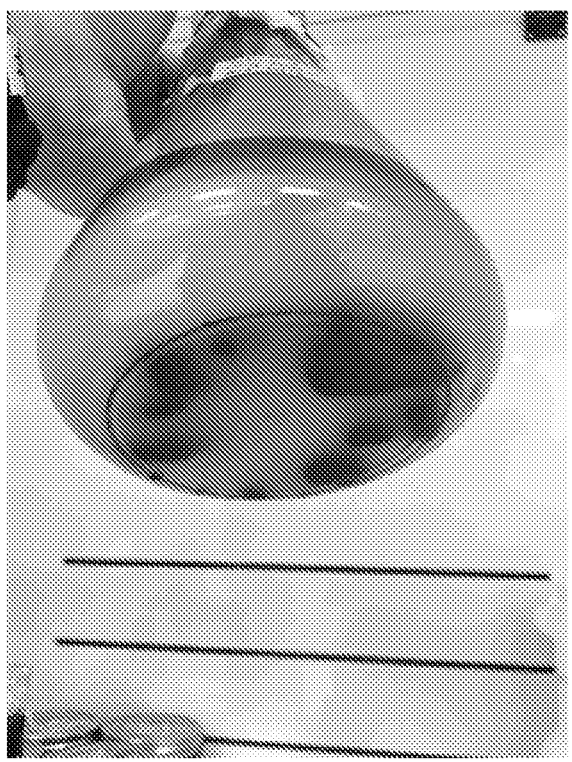
FIGS. 5A-5B shows 100 g of asphaltene precipitate in a second yeast treatment alone prior to shaking. 5A shows the treatment vial from below, with the precipitate visible as dark solids settled at the bottom. 5B shows the same treatment vial from the side.
Figure 5B:
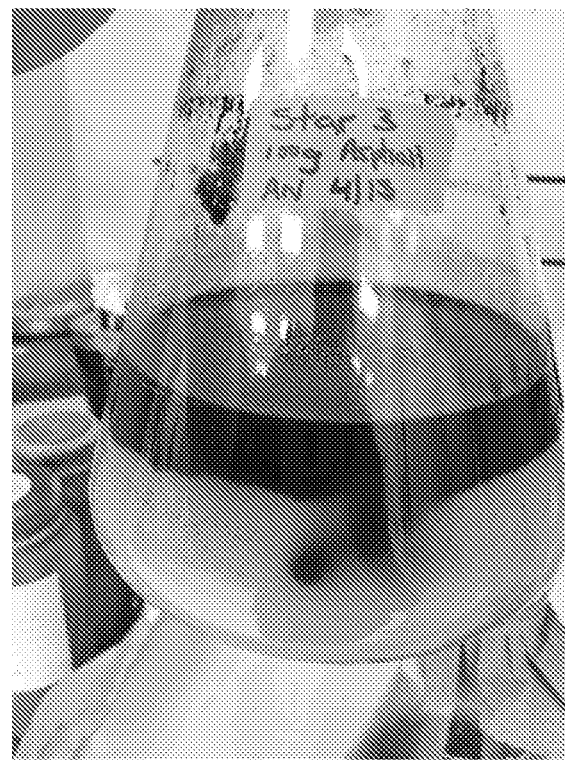
Figure 6:
FIG. 6 shows each of the flasks in FIGS. 1-6, prior to shaking.
Figure 7:
FIG. 7 shows each of the flasks in FIGS. 1-6, after 5 hours of shaking.
Figure 8A:
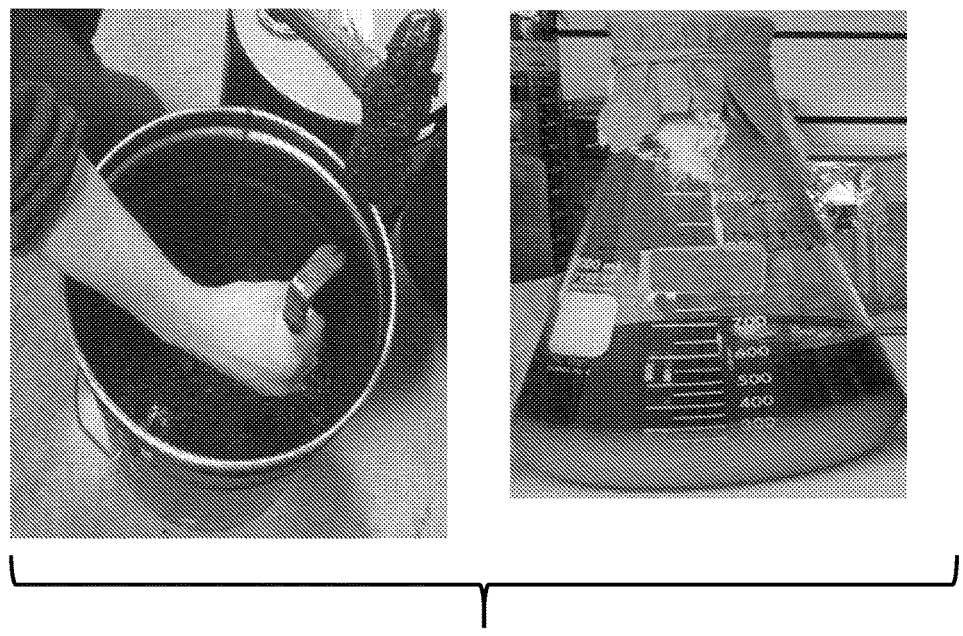
FIGS. 8A-8B show the upgrading of petcoke using the subject invention. 8A shows a container of rock hard petcoke, requiring the use of a hammer to break loose, being liquefied after only a few hours of treatment with the subject invention. 8B shows the increase in petcoke BTU content of refinery petcoke treated with the subject invention.
Figure 8B:
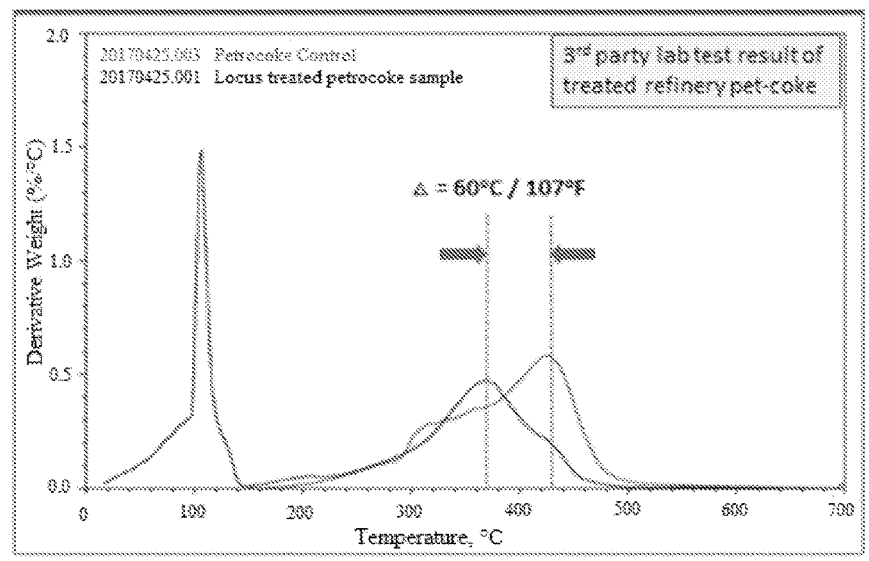
Figure 9:
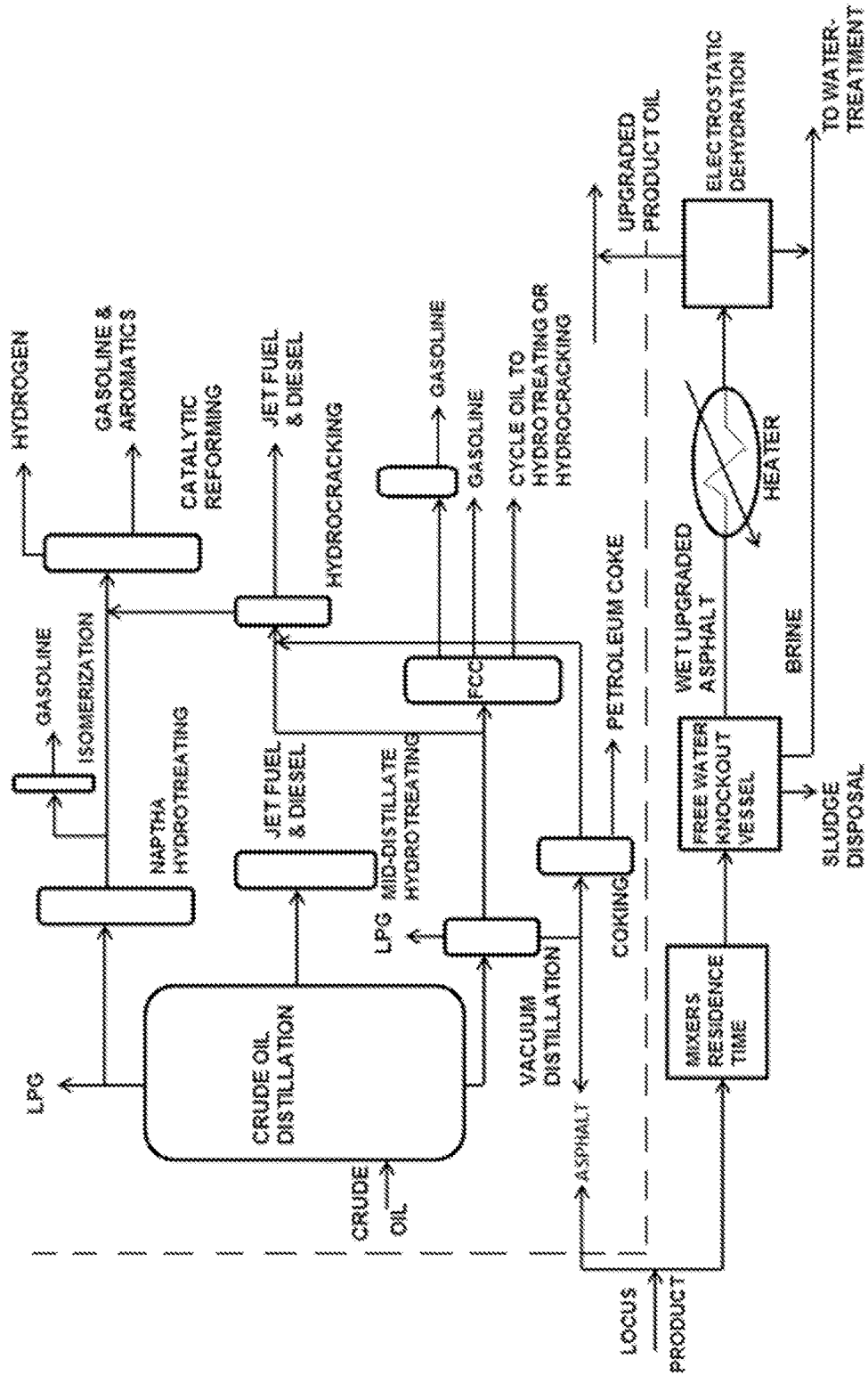
FIG. 9 shows a flow diagram exemplifying application of the subject microbe-based product within the oil refinery process.

As shown in FIG. 8, the flasks are subjected to 5 hours of shaking, after which amounts of asphaltene precipitate are determined.

Example 2—Cultivation of a Yeast Fermentation Product

A yeast fermentation product can be obtained via cultivation of a *Wickerhamomyces* yeast (e.g., *W. anomalus*) in medium containing necessary sources of carbon, nitrogen, minerals and optionally, antimicrobial substances to prevent contaminating bacterial growth. The culture can be grown with an additional carbon source, particularly, a saturated oil (e.g., 15% canola oil, or used cooking vegetable oil). The pH begins at 5.0-5.5, then decreases to 3.0-3.5, where it is stabilized. The fermentation broth, harvested after 20-24 hours of cultivation at 25-30° C., comprises the Star 3+ product.

Accumulation of sophorolipids in the fermentation broth can occur after 7 to 9 days of fermentation. Upon completion of the fermentation, the culture containing biomass and, if applicable, low concentration of sophorolipid, can then be added to the composition of the subject invention.

Example 3—Cultivation of Yeast Fermentation Products

A yeast fermentation product is obtained via cultivation of a biosurfactant-producing and/or metabolite-producing yeast, such as, for example, *Pichia anomala* (*Wickerhamomyces anomalus*). The fermentation broth after 7 days of cultivation at 25-30° C. can contain the yeast cell suspension and, for example, 4 g/L or more of biosurfactant.

The yeast fermentation product can also be obtained via cultivation of a biosurfactant-producing and/or metabolite-producing yeast, such as, for example, *Starmerella bombicola*. The fermentation broth after 5 days of cultivation at 25° C. can contain the yeast cell suspension and, for example, 150 g/L or more of biosurfactant.

We claim:

1. A method for upgrading heavy crude oil, which comprises applying a yeast-based composition and 1% to 5% by weight ionic liquid to the heavy crude oil,
   wherein the yeast based composition comprises a cultivated *Wickerhamomyces anomalus* yeast and/or growth by-product thereof and the broth separated from the yeast,
   wherein the ionic liquid is selected from ethyl ammonium nitrate and glycerol magnesium sulfate heptahydrate, and
   wherein upgrading the heavy crude oil comprises increasing the API gravity of the heavy crude oil and/or reducing impurities of the heavy crude oil.

2. The method of claim 1, wherein the further comprising applying a crude form sophorolipid (SLP) biosuifactant to the heavy crude oil.

3. The method of claim 1, which further comprises subjecting the heavy crude oil to cavitation.

4. The method of claim 1, wherein the heavy crude oil is in an oil-bearing formation and the yeast-based composition and ionic liquid are injected into the formation.

5. The method of claim 1, wherein the heavy crude oil has been recovered from an oil-bearing formation and is being stored in a storage tank or transported via tanker or pipeline, and wherein the yeast-based composition and ionic liquid are (I is ji applied into the storage tank, tanker or pipeline.

6. The method of claim 1, wherein the heavy crude oil is extra heavy crude oil having an API gravity of about 12° or lower.

7. The method of claim 1, wherein said method does not cause degradation of the heavy crude oil into methane or other gases.

8. The method of claim 1, wherein the API gravity of the heavy crude oil is increased to above 20°.

9. The method of claim 1, wherein the viscosity of the heavy crude oil is reduced to below 200 cp.

10. A method of converting heavy hydrocarbon substances into lighter hydrocarbon substances, wherein a yeast-based composition, a sophorolipid, and an ionic liquid, is applied to the heavy hydrocarbon substances,
    wherein the yeast-based composition comprises a cultivated *Wickerhamomyces anomalus* yeast and/or a growth by-product thereof, and a broth in which the yeast was cultivated,
    wherein the ionic liquid is selected from ethyl ammonium nitrate and glycerol magnesium sulfate heptahydrate, and
    wherein the heavy hydrocarbon substances are selected from asphaltenes, asphalts, tars, bitumens and petcoke.

11. The method of claim 1, wherein the impurities are selected from heavy metals, sulfur, nitrogen, ash, olefins, aromatics, naphthenes and asphaltenes.

* * * * *

UNITED STATES PATENT AND TRADEMARK OFFICE
CERTIFICATE OF CORRECTION

Page 1 of 1

PATENT NO. : 10,907,106 B2
APPLICATION NO. : 16/625288
DATED : February 2, 2021
INVENTOR(S) : Sean Farmer et al.

It is certified that error appears in the above-identified patent and that said Letters Patent is hereby corrected as shown below:

In the Specification

Column 3:
Line 37, "above about 200," should read -- above about 20°, --.

Column 4:
Line 1, "lower than 120" should read -- lower than 12° --.
Line 4, "250 or 30°" should read -- 25° or 30° --.

Column 8:
Line 34, "about 200 or" should read -- about 20° or --.
Line 36, "about 120." should read -- about 12°. --.

Column 9:
Line 46, "30° to 310" should read -- 30° to 31° --.
Line 59, "higher than 120," should read -- higher than 12°, --.
Line 61, "30° to 310" should read -- 30° to 31° --.

Column 20:
Line 43, "a and P" should read -- α and β --.

Column 22:
Line 17, "exo-3-1,3-gluconase." should read -- exo-β-1,3-gluconase. --.

In the Claims

Column 24:
Line 11, "are (I is ji applied" should read -- are applied --.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*